(12) United States Patent
Zeng et al.

(10) Patent No.: US 12,474,798 B2
(45) Date of Patent: Nov. 18, 2025

(54) TOUCH CONTROL STRUCTURE, TOUCH DISPLAY PANEL AND ELECTRONIC DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yang Zeng, Beijing (CN); Tianci Chen, Beijing (CN); Chang Luo, Beijing (CN); Yi Zhang, Beijing (CN); Wei Wang, Beijing (CN); Yu Wang, Beijing (CN); Ping Wen, Beijing (CN); Junxiu Dai, Beijing (CN); Siyu Wang, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/578,930

(22) PCT Filed: Oct. 31, 2022

(86) PCT No.: PCT/CN2022/128617
§ 371 (c)(1),
(2) Date: Jan. 12, 2024

(87) PCT Pub. No.: WO2024/092403
PCT Pub. Date: May 10, 2024

(65) Prior Publication Data
US 2025/0093993 A1    Mar. 20, 2025

(51) Int. Cl.
*G06F 3/041* (2006.01)
*H10K 59/40* (2023.01)

(52) U.S. Cl.
CPC ........ *G06F 3/04164* (2019.05); *G06F 3/0412* (2013.01); *H10K 59/40* (2023.02)

(58) Field of Classification Search
None
See application file for complete search history.

(56) References Cited

U.S. PATENT DOCUMENTS 11,334,179 B2   5/2022   Li et al.
11,500,499 B2   11/2022  Wang et al.
(Continued)

FOREIGN PATENT DOCUMENTS

CN   111665986 A   9/2020
CN   111668384 A   9/2020
(Continued)

OTHER PUBLICATIONS

Extended European search report cited in EP 22 96 3725, dated Jul. 15, 2025.

*Primary Examiner* — Parul H Gupta
(74) *Attorney, Agent, or Firm* — LEASON ELLIS LLP

(57) ABSTRACT

A touch control structure, a touch display panel and an electronic device are provided. The touch control structure includes a first metal layer, an insulation layer and a second metal layer that are sequentially stacked on the base substrate, the touch control structure is divided into a touch region and a peripheral region surrounding the touch region, and the peripheral region includes a first detection line and a second detection line that are sequentially arranged and spaced apart from each other along the direction from the touch region to the peripheral region; the first detection line is in the second metal layer, and the overlapping part of the second detection line is in the first metal layer; the first end (Continued)

of the second detection line includes a first detection part in the second metal layer and a second detection part in the first metal layer.

20 Claims, 12 Drawing Sheets

(56) References Cited

U.S. PATENT DOCUMENTS

| | | | |
|---|---|---|---|
| 11,567,595 B2 | 1/2023 | Kim et al. | |
| 11,567,598 B2 | 1/2023 | Hu et al. | |
| 11,616,115 B2 | 3/2023 | You | |
| 11,744,105 B2 | 8/2023 | Cai et al. | |
| 2013/0092520 A1* | 4/2013 | Lee | G06F 3/0443 200/600 |
| 2014/0182894 A1 | 7/2014 | Liu et al. | |
| 2020/0019294 A1* | 1/2020 | Lee | G06F 3/0412 |
| 2021/0200360 A1* | 7/2021 | Lee | G06F 3/0443 |
| 2021/0200364 A1* | 7/2021 | Won | H10K 59/131 |
| 2022/0344325 A1 | 10/2022 | Qu et al. | |
| 2023/0101823 A1 | 3/2023 | Zhao et al. | |
| 2024/0008309 A1* | 1/2024 | Park | G06F 3/0412 |

FOREIGN PATENT DOCUMENTS

| | | |
|---|---|---|
| CN | 111834544 A | 10/2020 |
| CN | 112181204 A | 1/2021 |
| CN | 112328120 A | 2/2021 |
| CN | 112612371 A | 4/2021 |
| CN | 112650411 A | 4/2021 |
| CN | 113325971 A | 8/2021 |
| CN | 113360024 A | 9/2021 |
| CN | 113725262 A | 11/2021 |
| CN | 113838871 A | 12/2021 |
| CN | 114429973 A | 5/2022 |
| CN | 114510901 A | 5/2022 |
| CN | 114651225 A | 6/2022 |
| CN | 114721534 A | 7/2022 |
| CN | 114830330 A | 7/2022 |
| KR | 20210081701 A | 7/2021 |

* cited by examiner

TOUCH CONTROL STRUCTURE, TOUCH DISPLAY PANEL AND ELECTRONIC DEVICE

CROSS-REFERENCE TO RELATED PATENT APPLICATIONS

This application is a U.S. National Stage Application under 35 U.S.C. § 371 of International Patent Application No. PCT/CN2022/128617 filed Oct. 31, 2022, which is incorporated by reference in its entirety.

TECHNICAL FIELD

Embodiments of the present disclosure relate to a touch control structure, a touch display panel and an electronic device.

BACKGROUND

Touch display panel includes one-glass-solution (OGS) touch panel, on-cell touch panel and in-cell touch panel. The on-cell touch panel has a higher touch accuracy than the in-cell touch panel. The on-cell touch panel can be divided into a single-layer-on-cell (SLOC) touch panel and a multi-layer-on-cell (MLOC) touch panel. The multi-layer-on-cell touch panel with excellent touch accuracy and shadow elimination effect can realize multi-point-touch panel.

On cell touch mode (FMLOC) of the organic light-emitting diode display devices has been widely used in the industry. FMLOC technology is used to detect whether there is touch through the change of the capacitance of the metal touch unit in the display area, and the touch wire connects the touch unit and the touch IC to provide electrical signals for the touch unit.

SUMMARY

At least one embodiment of the present disclosure provides a touch control structure, a touch display panel and an electronic device. In at least one embodiment of the present disclosure, the overlapping part of the second detection line and the first detection line are respectively arranged in two different layer structures, and the insulation layer is further arranged between the two different layer structures, so that even if the material of the first metal layer or the material of the second metal layer remains at the boundary of the organic layer, the problem of short circuit caused by the electrical communication between the first detection line and the second detection line cannot occur.

At least one embodiment of the present disclosure provides a touch control structure, and the touch control structure includes: a base substrate; a first metal layer, an insulation layer and a second metal layer that are sequentially stacked on the base substrate, in which on a plane parallel to a main surface of the base substrate, the touch control structure is divided into a touch region and a peripheral region surrounding the touch region, and along a direction from the touch region to the peripheral region, the peripheral region comprises a first detection line and a second detection line that are sequentially arranged and spaced apart from each other; the first detection line is arranged in the second metal layer, an overlapping part of the second detection line is arranged in the first metal layer, a first end of the second detection line comprises a first detection part arranged in the second metal layer and a second detection part arranged in the first metal layer, and the first detection part is electrically connected with the second detection part through a first via structure penetrating through the insulation layer.

For example, the touch control structure provided by at least one embodiment of the present disclosure, further comprises a common signal line on a side of the first detection line close to the touch region, in which the common signal line comprises a first sub-common signal line and a second sub-common signal line that are stacked, the first sub-common signal line is in the first metal layer, the second sub-common signal line is in the second metal layer, the first sub-common signal line is electrically connected with the second sub-common signal line through a second via structure which is in the insulation layer, an orthographic projection of at least part of the second sub-common signal line on the base substrate is within an orthographic projection of the first sub-common signal line on the base substrate, and a first distance is between an edge of the at least part of the second sub-common signal line close to the first detection line and an edge of the first sub-common signal line close to the first detection line.

For example, in the touch control structure provided by at least one embodiment of the present disclosure, the first distance is greater than 0.8 μm and less than 1.6 m.

For example, in the touch control structure provided by at least one embodiment of the present disclosure, the touch region is provided with a first touch electrode and a second touch electrode that are spaced apart from each other; a first touch electrode lead wire and a second touch electrode lead wire are arranged on a side of the common signal line close to the touch region, and the first touch electrode lead wire is electrically connected with the first touch electrode, and the second touch electrode lead wire is electrically connected with the second touch electrode; two adjacent first touch electrode lead wires in an extension direction of the first touch electrode lead wire are electrically connected through a first connection line, and two adjacent second touch electrode lead wires in an extension direction of the second touch electrode lead wire are electrically connected through a second connection line, one of the first connection line and the second connection line is only arranged in the first metal layer, and other one of the first connection line and the second connection line is only arranged in the second metal layer, and an orthographic projection of the first connection line on the base substrate at least partially overlaps with of an orthographic projection of the second connection line on the base substrate.

For example, in the touch control structure provided by at least one embodiment of the present disclosure, the first connection line is only arranged in the first metal layer, and the second connection line is only arranged in the second metal layer.

For example, in the touch control structure provided by at least one embodiment of the present disclosure, ends of the two adjacent first touch electrode lead wires close to each other are second ends, and each of the second ends comprises a first lead-out part and a second lead-out part which are sequentially stacked on the base substrate, and the first lead-out part and the second lead-out part are electrically connected through a third via structure which is arranged in the insulation layer, and the first lead-out part only comprises a part located in the first metal layer, the second lead-out part only comprises a part located in the second metal layer, and an orthographic projection of the second lead-out part on the base substrate is within an orthographic projection of the first lead-out part on the base substrate, and an area of the orthographic projection of the second lead-out part on the base substrate is smaller than that of the first lead-out part on the base substrate.

For example, in the touch control structure provided by at least one embodiment of the present disclosure, the extension direction of the first touch electrode lead wire is a first direction, and a direction perpendicular to the first direction is a second direction, in the second direction and on a first side of the first touch electrode lead wire in the second direction, a second distance is between the first lead-out part and the second lead-out part.

For example, in the touch control structure provided by at least one embodiment of the present disclosure, a value of the second distance ranges from 0.8 μm to 1.6 μm.

For example, in the touch control structure provided by at least one embodiment of the present disclosure, in the second direction and on a second side of the first touch electrode lead wire in the second direction, a third distance is between the first lead-out part and the second lead-out part, and the first side and the second side are opposite to each other.

For example, in the touch control structure provided by at least one embodiment of the present disclosure, a value of the third distance ranges from 0.8 μm to 1.6 μm.

For example, in the touch control structure provided by at least one embodiment of the present disclosure, on a plane parallel to the base substrate, planar shapes of the first connection line and the second connection line are both folded lines.

For example, in the touch control structure provided by at least one embodiment of the present disclosure, the extension direction of the first touch electrode lead wire and the extension direction of the second touch electrode lead wire are both parallel to an extension direction of the common signal line.

For example, in the touch control structure provided by at least one embodiment of the present disclosure, in the first direction, a distance between two adjacent first touch electrode lead wires in the first direction is greater than a distance between two adjacent second touch electrode lead wires in the first direction.

For example, at least one embodiment of the present disclosure further provides a touch display panel, and the touch display panel includes: a base substrate; a display structure and a touch control structure that are sequentially stacked on the base substrate, in which the display structure comprises a planarization layer, the touch control structure comprises a first metal layer, an insulation layer and a second metal layer that are sequentially stacked on the display structure, on a plane parallel to a main surface of the base substrate, the touch control structure is divided into a touch region and a peripheral region surrounding the touch region, along a direction from the touch region to the peripheral region, the peripheral region comprises a first detection line and a second detection line that are sequentially arranged and spaced apart from each other, an orthographic projection of an edge of the planarization layer on the base substrate intersects with both an orthographic projection of the first detection line and an orthographic projection of the second detection line on the base substrate; the first detection line is arranged in the second metal layer, and an overlapping part of the second detection line is arranged in the first metal layer, a first end of the second detection line comprises a first detection part arranged in the second metal layer and a second detection part arranged in the first metal layer, the first detection part is electrically connected with the second detection part through a first via structure penetrating through the insulation layer, and an orthographic projection of the overlapping part of the second detection line on the base substrate overlaps with an orthographic projection of the edge of the planarization layer on the base substrate.

For example, the touch display panel provided by at least one embodiment of the present disclosure, further comprises a common signal line arranged on a side of the first detection line close to the touch region, in which the orthographic projection of the edge of the planarization layer on the base substrate intersects with an orthographic projection of a part of the common signal line on the base substrate, and the common signal line comprises a first sub-common signal line and a second sub-common signal line that are stacked, the first sub-common signal line is arranged in the first metal layer, the second sub-common signal line is arranged in the second metal layer, the first sub-common signal line and the second sub-common signal line are electrically connected through a second via structure which is in the insulation layer, and at least at a position where the common signal line overlaps with the edge of the planarization layer, an orthographic projection of the second sub-common signal line on the base substrate is within an orthographic projection of the first sub-common signal line on the base substrate, and a first distance is between an edge of at least part of the second sub-common signal line close to the first detection line and an edge of the first sub-common signal line close to the first detection line.

For example, in the touch display panel provided by at least one embodiment of the present disclosure, the first distance is greater than 0.8 μm and less than 1.6 μm.

For example, in the touch display panel provided by at least one embodiment of the present disclosure, the touch region is provided with a first touch electrode and a second touch electrode that are spaced apart from each other; a first touch electrode lead wire and a second touch electrode lead wire are on a side of the common signal line close to the touch region, the first touch electrode lead wire is electrically connected with the first touch electrode, and the second touch electrode lead wire is electrically connected with the second touch electrode; two adjacent first touch electrode lead wires in an extension direction of the first touch electrode lead wire are electrically connected through a first connection line, and two adjacent second touch electrode lead wires in an extension direction of the second touch electrode lead wire are electrically connected through a second connection line, one of the first connection line and the second connection line is only arranged in the first metal layer, and other one of the first connection line and the second connection line is only arranged in the second metal layer, and an orthographic projection of the first connection line on the base substrate at least partially overlaps with of an orthographic projection of the second connection line on the base substrate.

For example, in the touch display panel provided by at least one embodiment of the present disclosure, the first connection line is only arranged in the first metal layer, and the second connection line is only arranged in the second metal layer.

For example, in the touch display panel provided by at least one embodiment of the present disclosure, ends of the two adjacent first touch electrode lead wires close to each other are second ends, and each of the second ends comprises a first lead-out part and a second lead-out part which are sequentially stacked on the base substrate, and the first lead-out part and the second lead-out part are electrically connected through a third via structure which is arranged in the insulation layer, and the first lead-out part only comprises a part located in the first metal layer, the second lead-out part only comprises a part located in the second metal layer, and an orthographic projection of the second lead-out part on the base substrate is within an orthographic projection of the first lead-out part on the base substrate, and an area of the orthographic projection of the second lead-out part on the base substrate is smaller than that of the first lead-out part on the base substrate.

For example, in the touch display panel provided by at least one embodiment of the present disclosure, on a plane parallel to the base substrate, planar shapes of the first connection line and the second connection line are both folded.

For example, in the touch display panel provided by at least one embodiment of the present disclosure, the extension direction of the first touch electrode lead wire is a first direction, and a direction perpendicular to the first direction is a second direction, the extension direction of the first touch electrode lead wire and the extension direction of the second touch electrode lead wire are both parallel to an extension direction of the common signal line.

For example, in the touch display panel provided by at least one embodiment of the present disclosure, the extension direction of the first touch electrode lead wire is a first direction, and a direction perpendicular to the first direction is a second direction, in the second direction and on a first side of the first touch electrode lead wire in the second direction, a second distance is between the first lead-out part and the second lead-out part, and/or, in the second direction and on a second side of the first touch electrode lead wire in the second direction, a third distance is between the first lead-out part and the second lead-out part, and the first side and the second side are opposite to each other.

For example, in the touch display panel provided by at least one embodiment of the present disclosure, in the first direction, a distance between two adjacent first touch electrode lead wires in the first direction is greater than a distance between two adjacent second touch electrode lead wires in the first direction.

For example, in the touch display panel provided by at least one embodiment of the present disclosure, the display structure is an organic light-emitting display panel; the organic light-emitting display panel comprises a pixel circuit layer, an organic light-emitting layer and an encapsulation layer that are sequentially arranged; the touch control structure is on a side of the encapsulation layer away from the organic light-emitting layer.

At least one embodiment of the present disclosure further provides an electronic device, and the electronic device includes any one of the touch control structures in the above embodiments or any one of the touch display panels in the above embodiments.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
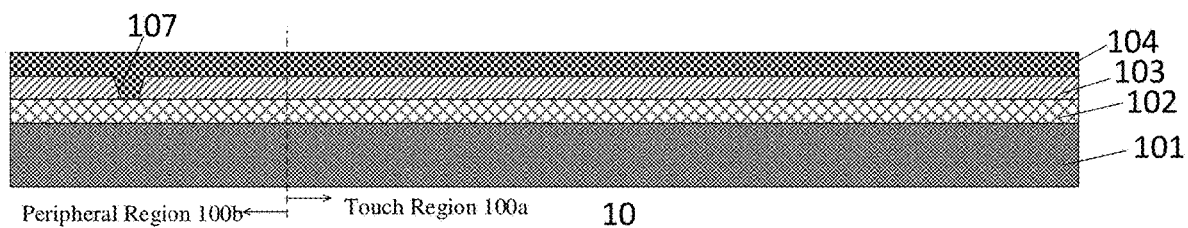
FIG. 1 is a schematic cross-sectional view of a touch control structure provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the present disclosure. Based on the described embodiments herein, those skilled in the art can obtain other embodiment (s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

The drawings in the embodiment of the present disclosure are not drawn strictly according to the actual scale, and the numbers of the first metal layer, the insulation layer, the second metal layer, the first detection line, the second detection line, the common signal line, the first touch electrode, the second touch electrode, the first touch electrode lead wire, the second touch electrode lead wire, the first connection line and the second connection line in the touch control structure are not limited to the numbers, sizes and structures shown in the drawings. The drawings described in the embodiments of the present disclosure are only structural schematic diagrams and do not show the complete product structure.

With the development of touch technology and display technology, display devices with various shapes have been developed. Researchers are developing flexible display devices that can be curled and deformed or flexible display devices that are foldable and rollable.

For example, the flexible multi-layer on cell technology has been widely used in touch devices. The flexible multi-layer structure can be used to form a touch layer, the flexible multi-layer on cell (FMLOC) structure on the panel includes auxiliary film layers such as a first metal layer, an insulation layer, a second metal layer, a barrier layer and a protection layer. Different from the structure of the traditional external touch panel hanging on the outside of the display panel, the flexible multi-layer on cell structure is directly formed on the encapsulation film of the basic display panel through processes such as deposition, exposure, development, etching, etc., so that the flexible multi-layer on cell structure and the basic display panel present an integrated structure, which is beneficial to making the finally formed display device light and thin. The design of the PCD (Panel Crack Detection) circuit is integrated into the flexible multi-layer (FMLOC) on cell structure, that is, the first metal layer and the second metal layer in the FMLOC structure are used to manufacture the PCD wires and ground wires GND (Ground). The function of the PCD wires is mainly to realize the PCD detection in the panel section or module section after the films of the FMLOC structure are formed, that is, whether the PCD wires are broken can be judged through the PCD detection, so as to judge whether there is a crack extending to the area where the PCD wires are located in there are cracks on the frame of the display panel that extend to the region of the PCD wires. The main function of ground wires GND is to prevent external interference. The PCD wires are arranged on the side of the ground wires GND away from the touch region, and the PCD wires sand the ground wires GND (Ground) are designed into a double-layer structure including a first metal layer and a second metal layer, which can reduce the resistance.

For example, the detection principle of the PCD detection is as follows: the PCD wires are surrounded by two loops on two sides of the panel, and the two loops are connected to the resistance detection IC (Circuit Board Integrated Circuit) through terminals. Usually, the wiring resistance of the loop is 40 kiloohms. If there is a crack in the PCD wire or micro-contact caused by fine cracks in the PCD wire, the resistance of the PCD wire will rise to 100 kiloohms or infinity due to the crack.

For example, the basic display panel includes an organic light-emitting diode (OLED) display panel, which has the characteristics of self-luminescence, high contrast, low energy consumption, wide viewing angle, fast response, can be used for flexible panels, wide use temperature range, simple manufacture and so on, and has broad development prospects. In order to meet the diverse needs of users, it is of great significance to integrate various functions in the display panel, such as touch control function and fingerprint identification function. For example, forming an on-cell touch control structure in an OLED display panel is an implementation mode, which enables the display panel to have a touch function by forming the touch control structure on the encapsulation film of the OLED display panel.

For example, the mutual-capacitance touch control structure includes a plurality of touch electrodes, the plurality of touch electrodes include a touch driving electrode and a touch sensing electrode that extend in different directions, and the touch driving electrode and touch sensing electrode form mutual capacitance for touch sensing at the intersection positions where they intersect each other. The touch driving electrode is used for inputting an excitation signal (touch driving signal), and the touch sensing electrode is used for outputting a touch sensing signal. By inputting an excitation signal to, for example, a touch driving electrode extending longitudinally and receiving a touch sensing signal from, for example, a touch sensing electrode extending transversely, a detection signal reflecting the capacitance value of a coupling point (for example, an intersection point) between the transverse electrode and a longitudinal electrode can be obtained. When a finger touches the touch screen (such as cover glass), the coupling between the touch driving electrode and the touch sensing electrode close to the touch point is affected, thus changing the capacitance value of the mutual capacitance between the two electrodes at the intersection point, and further leading to the change of the touch sensing signal. According to the data of two-dimensional capacitance variation of the touch screen based on the touch sensing signal, the coordinates of the touch point can be calculated.

For example, the principle of the mutual-capacitance touch control structure is that, driven by the touch driving circuit, the touch driving electrode is applied with a touch driving signal, and thus electric field lines are generated, which are received by the touch sensing electrode to form a reference capacitance. When a finger touches the touch screen, because the human body is a conductor, a part of electric field lines generated by the touch driving electrode are guided to the finger to form a finger capacitance, which reduces the electric field lines received by the touch sensing electrode, so the capacitance value between the touch driving electrode and the touch sensing electrode is reduced. The touch driving circuit obtains the capacitance value through the touch sensing electrode, and compares it with the reference capacitance to obtain the variation of the capacitance value. According to the data of the variation of the capacitance value and the position coordinates of each touch capacitor, the coordinates of the touch point can be calculated.

For example, in the touch control structure, when a metal layer is formed on the organic layer after the organic layer is formed, the metal layer easily remains at the boundary of the organic layer, and due to the limitation of the frame space at the edge of the touch panel, the crack defect detection PCD wire and the ground wire GND of the flexible multi-layer on cell (FMLOC) will cross the boundary of the organic layer, and the metal remaining at the boundary of the organic layer will conduct two PCD wires to cause the defect detection function of the PCD wires to be lost, and, there may be a short circuit between the PCD wire and the GND wires. The inventors of the present disclosure noticed that the above PCD wires and GND wires which are prone to short circuit can be improved as follows: the outermost PCD wire is converted into a single-layer structure with an overlapping part only corresponding to the first metal layer at the boundary position across the organic layer, and the PCD wires close to the touch region are set as a single-layer structure only corresponding to the second metal layer, so that the short circuit phenomenon can be prevented in the case that two adjacent PCD wires are too close to each other and include structures in the same layer in the preparation process thereof. The part of the GND wires located at the second metal layer at the position across the boundary of the organic layer is retracted to the side away from the PCD wires, so that the part of the GND wire corresponding to the second metal layer is within the boundary corresponding to the first metal layer and does not appear outside the boundary of the part corresponding to the first metal layer, and therefore the part of the GND wire corresponding to the second metal layer can be prevented from overlapping and contact with the PCD wire close to this GND wire, which can avoid the conduction between the PCD wire and the GND wire.

The inventors of the present disclosure have also noticed that due to the limitation of process conditions, in the case that photoresist is coated on the first metal film and the second metal film, and then the first metal film and the second metal film are patterned, due to the slope of the planarization layer is formed by the organic material, the coated photoresist will flow downward, which results in a photoresist having a thicker thickness at the boundary of the planarization layer is formed, and the photoresist will remain due to insufficient exposure, further, the underlying first metal film and the second metal film to be etched cannot be completely etched, so that the phenomenon of metal residue occurs, that is, there will be a slope at the boundary of the formed first metal layer, and the existence of the slope in the first metal layer may cause the second metal layer to remain on the first metal layer, and at the crossing position of the touch driving electrode connection line and the touch sensing electrode connection line, the short circuit phenomenon will occur due to the metal material of the second metal layer remaining on the first metal layer. Therefore, it can be considered that one end or both ends of the part of the thread head, of the touch driving electrode connection line or the touch sensing electrode connection line that will be designed to intersect with each other, corresponding to the second metal layer, are shrunk, so as to lengthen the path where the second metal layer may remain on the first metal layer, thus reducing the risk of short circuit.

At least one embodiment of the present disclosure provides a touch control structure, the touch control structure comprises: a base substrate, and a first metal layer, an insulation layer and a second metal layer that are sequentially stacked on the base substrate; on the plane parallel to a main surface of the base substrate, the touch control structure is divided into a touch region and a peripheral region surrounding the touch region, and along a direction from the touch region to the peripheral region, the peripheral region includes a first detection line and a second detection line that are sequentially arranged and spaced apart from each other; the first detection line is arranged in the second metal layer, an overlapping part of the second detection line is arranged in the first metal layer, a first end of the second detection line comprises a first detection part arranged in the second metal layer and a second detection part arranged in the first metal layer, and the first detection part is electrically connected with the second detection part through a first via structure penetrating through the insulation layer. According to the embodiment of the present disclosure, the part, of the outermost PCD wire at the boundary position across the organic layer, that is, the overlapping part, has only a single-layer structure corresponding to the first metal layer, and the PCD wire close to the touch region has only a single-layer structure corresponding to the second metal layer, so that the phenomenon that two adjacent PCD wires are short-circuited can be prevented.

Figure 2:
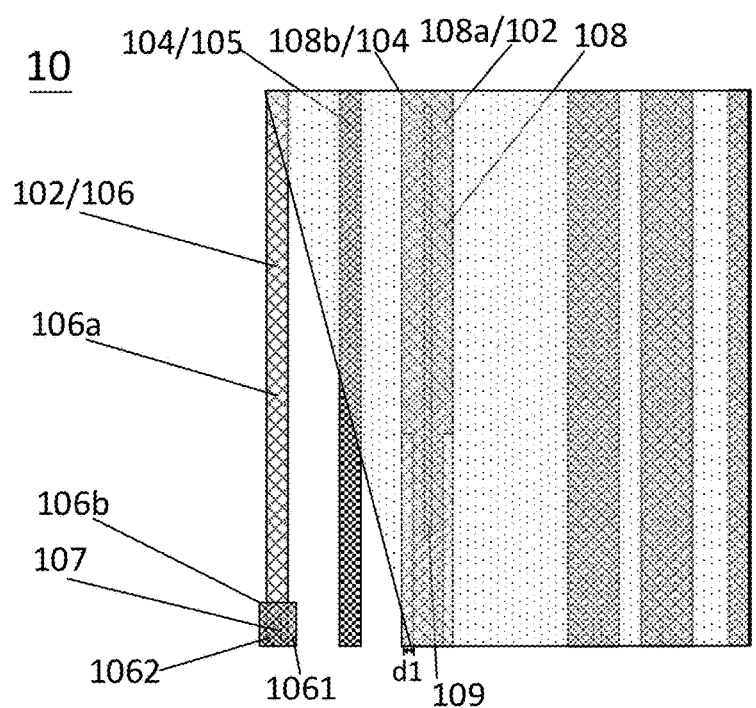
FIG. 2 is a schematic planar view of a touch control structure provided by at least one embodiment of the present disclosure.

FIG. 1 is a schematic cross-sectional view of a touch control structure provided by at least one embodiment of the present disclosure, FIG. 2 is a schematic planar view of a touch control structure provided by at least one embodiment of the present disclosure, with reference to FIG. 1 and FIG. 2, the touch control structure 10 includes a base substrate 101, a first metal layer 102, an insulation layer 103 and a second metal layer 104 which are sequentially stacked on the base substrate 101. On the plane parallel to the main surface of the base substrate 101, the touch control structure 10 is divided into a touch region 100a and a peripheral region 100b surrounding the touch region 100a, along the direction from the touch region 100a to the peripheral region 100b, the peripheral region 100b includes a first detection line 105 and a second detection line 106 which are sequentially arranged and spaced apart from each other, the first detection line 105 is arranged in the second metal layer 104, and the overlapping part 106a of the second detection line 106 is arranged in the first metal layer 102, the first end 106b of the second detection line 106 includes a first detection part 1061 arranged in the second metal layer 104 and a second detection part 1062 arranged in the first metal layer 102, and the first detection part 1061 and the second detection part 1062 are electrically connected through a first via structure 107 penetrating through the insulation layer 103. In the embodiment of the present disclosure, the overlapping part 106a of the second detection line 106 is set as a single-layer structure in the first metal layer 102, and the first detection line 105 is set as a single-layer structure in the second metal layer 104, because the overlapping part 106a of the second detection line 106 and the first detection line 105 are set in different layer structures, and an insulation layer is further set between the two layer structures, even if the material of the first metal layer or the material of the second metal layer remains at the boundary of the organic layer, the problem of short circuit caused by electrical communication between the first detection line 105 and the second detection line 106 will not occur, so that the phenomenon of short circuit between the adjacent first detection line 105 and the second detection line 106 can be prevented through the above structural design.

For example, as shown in FIG. 2, the first detection part 1061 and the second detection part 1062 are arranged in different layer structures, that is, the first end 106b of the second detection line 106 includes a structure in which the first metal layer 102 and the second metal layer 104 are stacked, that is, at one end of the second detection line 106, the first detection part 1061 is electrically connected to the second detection part 1062 by the first via structure 107 arranged in the insulation layer 103, and the other end is used to apply voltage. The first end 106b of the second detection line 106 is an area completely covered by the organic layer, not the edge position of the organic layer, so the problem of material residue of the first metal layer or the second metal layer is not easy to occur at the first end. Therefore, even if the first end 106b of the second detection line 106 is set as a structure in which the first metal layer 102 and the second metal layer 104 are stacked, the problem of short circuit between the first detection line 105 and the second detection line 104 caused by metal material residue will not occur.

For example, with reference to FIG. 1, in the actual preparation process, a first metal layer 102 is formed first, an insulation layer 103 is formed on the first metal layer 102, a first via structure 107 is formed in the insulation layer 103, and then a second metal layer 104 is formed on the insulation layer 103, and part of the material of the second metal layer 104 is formed in the first via structure 107, so that the first metal layer 102 is electrically connected to the second metal layer 104 through the first via structure 107.

For example, as shown in FIG. 2, the touch control structure 10 further includes a common signal line 108 arranged on a side of the first detection line 105 close to the touch region 100a, and the common signal line 108 includes a first sub-common signal line 108a and a second sub-common signal line 108b which are stacked with each other, the first sub-common signal line 108a is arranged in the first metal layer 102, and the second sub-common signal line 108b is arranged in the second metal layer 104, that is, the first sub-common signal line 108a and the second sub-common signal line 108b that are formed in different layer structures are electrically connected through the second via structure 109 provided in the insulation layer 103. For example, as shown in FIG. 2, the shape of the second via structure 109 is groove-shaped, the second via structure 109 corresponds to most regions of the first sub-common signal line 108a and the second sub-common signal line 108b, and the second via structure 109 is not provided at two ends of both the first sub-common signal line 108a and the second sub-common signal line 108b. In other examples, the second via structure 109 may run through the whole area corresponding to the first sub-common signal line 108a and the second sub-common signal line 108b. Alternatively, the second via structure 109 may only correspond to an area corresponding to the same end of both the first sub-common signal line 108a and the second sub-common signal line 108b, as long as the second via structure 109 is made to electrically connect the first sub-common signal line 108a and the second sub-common signal line 108b, which is not limited by the embodiment of the present disclosure.

For example, as shown in FIG. 2, the orthographic projection of at least part of the second sub-common signal line 108a on the base substrate 101 is within the orthographic projection of the first sub-common signal line 108a on the base substrate 101, and a first distance d1 is between the edge of at least part of the second sub-common signal line 108b close to the first detection line 105 and the edge of the first sub-common signal line 108a close to the first detection line 105. That is, the edge of at least part of the second sub-common signal line 108b close to the first detection line 105 is not aligned with the edge of the first sub-common signal line 108a close to the first detection line 105, so that the distance between the first detection line 105 and at least part of the second sub-common signal line 108b can be widened, and the boundary of the organic layer does not intersect with the lower part of the second sub-common signal line 108b due to the retraction of the second sub-common signal line 108b. Therefore, the material residue of the second metal layer can be reduced, so that the risk of electrical conduction between the first detection line 105 and the second sub-common signal line 108b can be reduced, and further, the electrical connection between the common signal line 108 and the first detection line 105 can be avoided. In addition, even if the material of the second metal layer 104 used for forming the second sub-common signal line 108b falls between the second sub-common signal line 108b and the first detection line 105, because the distance between the first detection line 105 and at least part of the second sub-common signal line 108b becomes larger, the remaining material of the second metal layer 104 is mostly scattered and discontinuous, so that the discontinuous material of the second metal layer 104 will not electrically connect the second sub-common signal line 108b and the first detection line 105.

It should be noted that in FIG. 2, a gap is also between part of the edge of the second sub-common signal line 108b away from the first detection line 105 and part of the edge of the first sub-common signal line 108a away from the first detection line 105, but the embodiment of the present disclosure is not limited to this case, and the entire edge of the second sub-common signal line 108b away from the first detection line 105 and the entire edge of the first sub-common signal line 108a away from the first detection line 105 may be aligned, which is not limited in the embodiment of the present disclosure.

It should also be noted that in FIG. 2, a first distance d1 is between the lower part of the side edge of the second sub-common signal line 108a close to the first detection line 105 and the lower part of the side edge of the first sub-common signal line 108a close to the first detection line 105. In other examples, a first distance d1 may be between the entire side edge of the second sub-common signal line 108b close to the first detection line 105 and the entire side edge of the first sub-common signal line 108a close to the first detection line 105. In still other examples, a first distance d1 may be between the lower part of the side edge of the second sub-common signal line 108a close to the first detection line 105 and the lower part of the side edge of the first sub-common signal line 108a close to the first detection line 105, and the entire edge of the second sub-common signal line 108a away from the first detection line 105 may be aligned, so that the problem of short circuit caused by the material of the second metal layer 104 remaining at the position corresponding to the edge of the organic layer can be avoided. The organic layer is a layer structure existing in the basic display panel, but it does not exist in the touch control structure. When the touch control structure and the basic display panel are stacked, the organic layer will affect the subsequent formation of the first metal layer and the second metal layer, and the organic layer will not be described separately herein.

For example, in one example, the common signal line 108 may be a grounded signal line, for example, a GND wire, but the embodiment of the present disclosure is not limited to this case, and may be other signal lines.

For example, in one example, the first distance d1 between at least part of the edge of the second sub-common signal line 108a close to the first detection line 105 and the edge of the first sub-common signal line 108a close to the first detection line 105 is greater than 0.8 μm and less than 1.6 μm. For example, the first distance d1 may be 0.9 μm, 1 μm, 1.1 μm, 1.2 μm, 1.3 μm, 1.4 μm or 1.5 μm. In the case where the first distance d1 is less than or equal to 0.8 μm, the distance between at least part of the edge of the second sub-common signal line 108b close to the first detection line 105 and the edge of the first sub-common signal line 108a close to the first detection line 105 is too small, so that the metal material remaining between the first detection line 105 and the second sub-common signal line 108b cannot be completely avoided from electrically communicating the first detection line 105 and the second sub-common signal line 108b. In the case where the first distance d1 is greater than or equal to 1.6 μm, the technical effect of narrow frame cannot be achieved.

Figure 3:
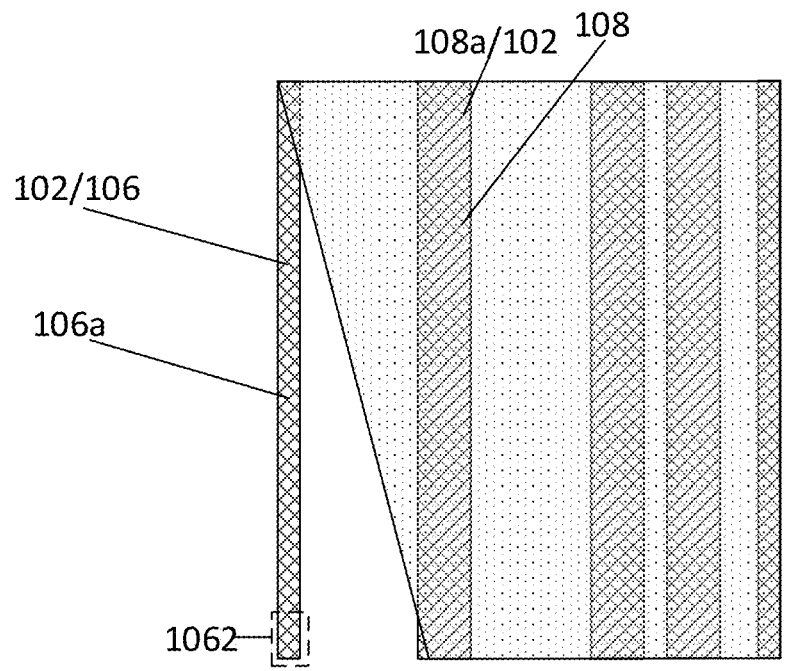
FIG. 3 is a view showing a layout of the planar structure of the single layer of the first metal layer in FIG. 2.

For example, FIG. 3 is a view showing a layout of the planar structure of the single layer of the first metal layer in FIG. 2. As shown in FIG. 3, although the organic layer is not included in the touch control structure 10, the boundary of the organic layer is shown in FIG. 3. The boundary of the organic layer intersects with the upper half of the overlapping part 106a of the second detection line 106 (formed on the first metal layer) and intersects with the lower part of the edge of the first sub-common signal line 108a close to the first detection line 105. Because the distance between the second detection line 106 and the first sub-common signal line 108a is large enough, even if there is remaining of the material of the first metal layer between the second detection line 106 and the first sub-common signal line 108a, the material of the remaining first metal layer is scattered and discontinuous, so the second detection line 106 and the first sub-common signal line 108a will not be electrically connected by the remaining first metal layer to cause a short circuit problem.

Figure 4:
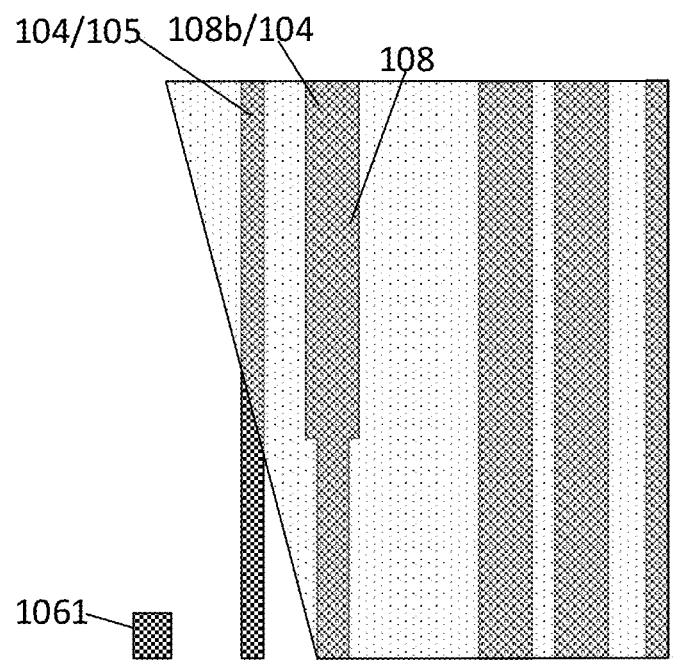
FIG. 4 is a view showing a layout of the planar structure of the single layer of the second metal layer in FIG. 2.

For example, FIG. 4 is a view showing a layout of the planar structure of the single layer of the second metal layer in FIG. 2. For example, FIG. 4 also shows the boundary of the organic layer, which intersects the middle part of the first detection line 105 and the lower edge of the second sub-common signal line 108b close to the first detection line 105. After the lower edge of the second sub-common signal line 108b in FIG. 4, which is close to the first detection line 105, is retracted to the side away from the first detection line 105, the probability that the material of the second metal layer 104 forming the second sub-common signal line 108b falls outside the boundary of the second sub-common signal line 108b, which leads to the communication between the first detection line 105 and the second sub-common signal line 108b, can be reduced.

Figure 5:
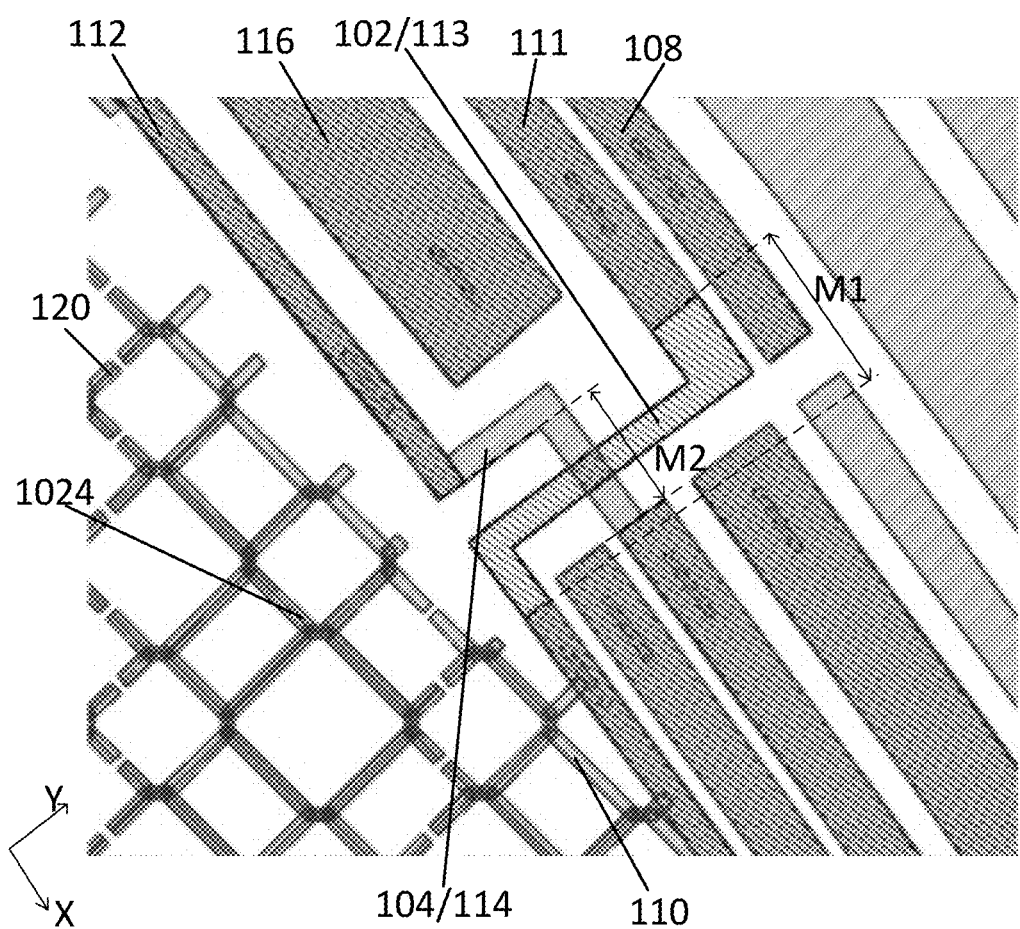
FIG. 5 is a schematic planar view of another touch control structure provided by at least one embodiment of the present disclosure.
Figure 6:
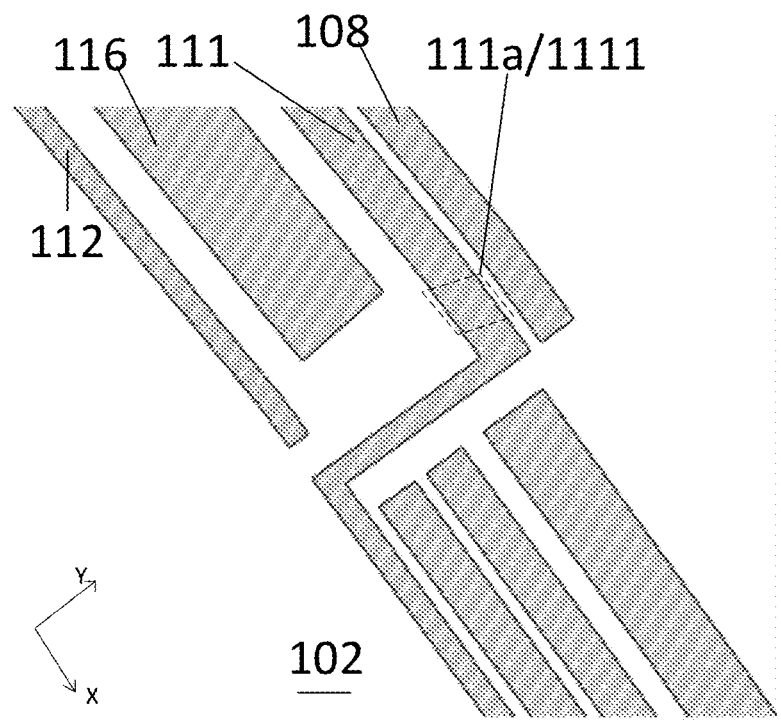
FIG. 6 is a view showing a layout of the planar structure of the single layer of the first metal layer in FIG. 5.
Figure 7:
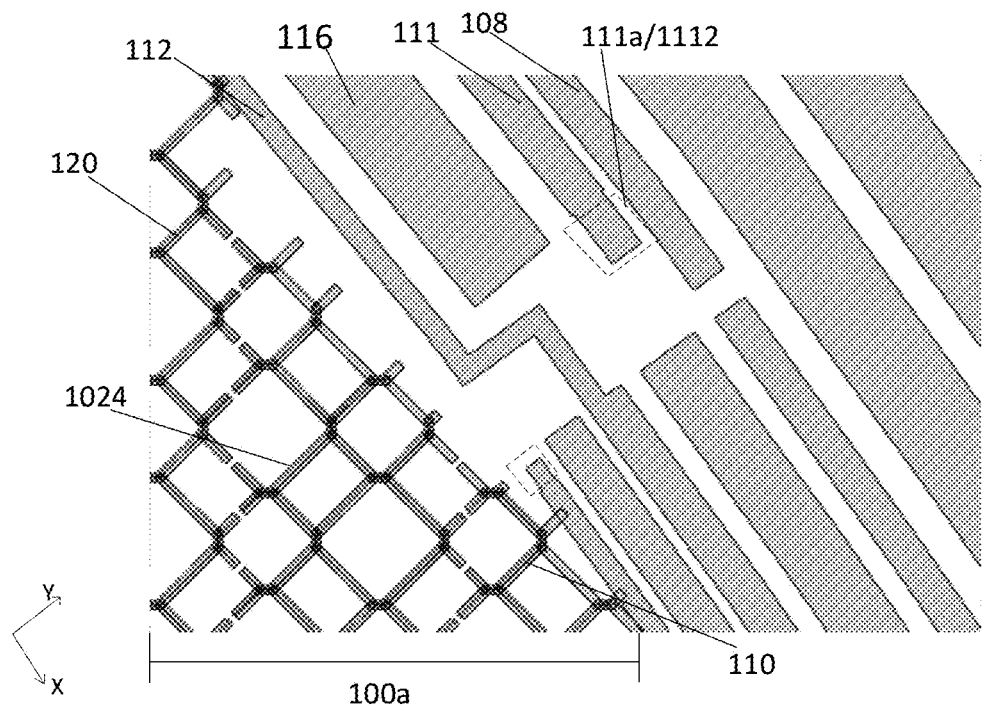
FIG. 7 is a view showing a layout of the planar structure of the single layer of the second metal layer in FIG. 5.

For example, FIG. 5 is a schematic planar view of another touch control structure provided by at least one embodiment of the present disclosure, FIG. 6 is a view showing a layout of the planar structure of the single layer of the first metal layer in FIG. 5, and FIG. 7 is a view showing a layout of the planar structure of the single layer of the second metal layer in FIG. 5. For example, the touch control structure will be described with reference to FIGS. 5 to 7. For example, as shown in FIG. 7, a touch region 100a is provided with a first touch electrode 110 and a second touch electrode 120 which are spaced apart from each other. The first touch electrode 110 and the second touch electrode 120 may be a touch driving electrode and a touch sensing electrode respectively, and mutual capacitance is formed at the intersections of the first touch electrode 110 and the second touch electrode 120 for touch sensing. For example, as shown in FIG. 5, a first touch electrode lead wire 111 and a second touch electrode lead wire 112 are provided on a side of the common signal line 108 close to the touch region 100a. The first touch electrode lead wire 111 is electrically connected with the first touch electrode 110, so that the first touch electrode lead wire 111 leads out signals in the first touch electrode 110. The second touch electrode lead wire 112 is electrically connected with the second touch electrode 120, so that the second touch electrode lead wire 112 leads out signals in the second touch electrode 120.

For example, as shown in FIG. 5, two adjacent first touch electrode lead wires 111 in the extension direction of the first touch electrode lead wires 111 are electrically connected by a first connection line 113. In FIG. 5, the extension direction of the first touch electrode lead wires 111 is parallel to the first direction X, that is, the extension direction of the first touch electrode lead wires 111 is parallel to the extension direction of the common signal line 108. The first connection line 113 only includes a part disposed on the first metal layer 102, that is, the first connection line 113 has a single-layer structure, and the planar shape of the first connection line 113 is a folded line. Each of the first touch electrode lead wires 111 includes a laminated structure constituted by a first metal layer 102 and a second metal layer 104. The overall planar shape of the first touch electrode lead wire 111 is a straight line, and besides the part extending in the direction parallel to the first direction X, the first connection line 113 also includes a branch part extending in the direction parallel to the second direction Y, the first direction X and the second direction Y are mutually perpendicular directions.

For example, as shown in FIG. 6, the part of the first touch electrode lead wire 111 disposed in the first metal layer 102 and the first connection line 113 are integrally formed. The second touch electrode lead wire 112 also includes a part formed in the first metal layer 102, and the second touch electrode lead wire 112 is in a shape of a straight line, and the parts of two adjacent second touch electrode lead wires 112 in the first metal layer 102 are spaced from each other in FIG. 6.

For example, as shown in FIG. 5, two adjacent second touch electrode lead wires 112 in the extension direction of the second touch electrode lead wires 112 are electrically connected by a second connection line 114. For example, the extension direction of the second touch electrode lead wire 112 is parallel to the extension direction of the common signal line 108, that is, parallel to the direction in which the first direction X is located. The second connection line 114 only includes a part formed on the second metal layer 104, that is, the second connection line 114 is in a single-layer structure, and the planar shape of the second connection line 114 is a folded line. Each of the second touch electrode lead wires 112 includes a laminated structure constituted by the first metal layer 102 and the second metal layer 104. The planar shape of the second touch electrode lead wire 112 is a straight line.

For example, as shown in FIG. 7, the part of the second touch electrode lead wire 112 disposed in the second metal layer 104 and the second connection line 114 are formed as a whole. The first touch electrode lead wires 111 also include parts formed in the second metal layer 104, and in FIG. 7, the parts of two adjacent first touch electrode lead wires 111 in the second metal layer 104 are spaced from each other.

It should be noted that although in FIGS. 5 to 7, the first connection line 113 is only provided in the first metal layer 102 and the second connection line 114 is only provided in the second metal layer 104, the embodiments of the present disclosure are not limited to this case, and it is required that one of the first connection line 113 and the second connection line 114 is only provided in the first metal layer 102 and the other is only provided in the second metal layer 104. The orthographic projection of the first connection line 113 on the base substrate 101 and the orthographic projection of the second connection line 114 on the base substrate 101 may at least partially overlap, that is, the first connection line 113 may be arranged only in the second metal layer 104 and the second connection line 114 may be arranged only in the first metal layer 102.

For example, as shown in FIG. 5, the distance between two adjacent first touch electrode lead wires 111 in the first direction X is greater than that between two adjacent second touch electrode lead wires 112 in the first direction X. For example, in FIG. 5, the distance between two adjacent first touch electrode lead wires 111 in the first direction X is M1, the distance between two adjacent second touch electrode lead wires 112 in the first direction X is M2, and it can be seen from FIG. 5 that M1 is obviously larger than M2, that is, the length of the first touch electrode lead wire 111 in the first direction X is shortened, and it is retracted.

For example, as shown in FIG. 5 and FIG. 7, a floating electrode 1024 is further arranged between the first touch electrode 110 (touch driving electrode) and the second touch electrode 120 (touch sensing electrode). The first touch electrode 110 includes a plurality of first touch sub-electrodes, and the second touch electrode includes a plurality of second touch sub-electrodes, that is, the floating electrode 1024, spaced apart from both the first touch sub-electrode and the second touch sub-electrode that are spaced apart from each other, is arranged between the first touch sub-electrode and second touch sub-electrode that are spaced apart from each other. The floating electrode 1024 is insulated from the first touch electrode 110 (touch driving electrode) and the second touch electrode 120 (touch sensing electrode).

Figure 8:
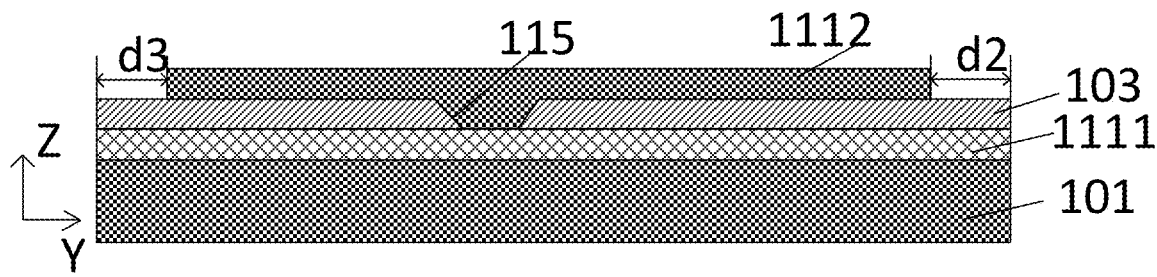
FIG. 8 is a schematic cross-sectional view of a second end provided by at least one embodiment of the present disclosure.

For example, FIG. 8 is a schematic cross-sectional structure diagram of a second end provided by at least one embodiment of the present disclosure. Combining with FIGS. 5, 6, 7 and 8, the ends of two adjacent first touch electrode lead wires 111 that are close to each other are second ends 111a, and the second ends 111a include a first lead-out part 1111 and a second lead-out part 1112 that are sequentially stacked on the base substrate 101, the first lead-out part 1111 and the second lead-out part 1112 are electrically connected through a third via structure 115 arranged in the insulation layer 103, the first lead-out part 1111 only includes a part located in the first metal layer 102, the second lead-out part 1112 only includes a part located in the second metal layer 104, the orthographic projection of the second lead-out part 1112 on the base substrate 101 is within the orthographic projection of the first lead-out part 1111 on the base substrate 101, and the area of the orthographic projection of the second lead-out part 1112 on the base substrate 101 is smaller than that of the orthographic projection of the first lead-out part 1111 on the base substrate 101. In this way, the distance between the second lead-out part 1112 and the adjacent common signal line 108 can be increased, so that the path where the remaining metal material may be formed can be lengthened, and the risk of short circuit can be reduced.

For example, in combination with FIGS. 5 to 8, in the second direction Y, and on the first side of the first touch electrode lead wire 111 along the second direction Y, there is a second distance d2 between the first lead-out part 1111 and the second lead-out part 1112. For example, the direction Z shown in FIG. 8 is a direction perpendicular to the main surface of the base substrate 101. As shown in FIG. 8, the value range of the second distance d2 is 0.8 μm to 1.6 μm, and the second distance d2 may be 0.8 μm, 0.9 μm, 1 μm, 1.1 μm, 1.2 μm, 1.3 μm, 1.4 μm, 1.5 μm or 1.6 μm. For example, in the case where the second distance d2 is less than 0.8 μm, the gap between the first lead-out part 1111 and the second lead-out part 1112 is too small, so that it is impossible to completely avoid the metal material remaining between the second lead-out part 1112 and the adjacent common signal line 108 from electrically communicating the second lead-out part 1112 with the common signal line 108 adjacent to the second lead-out part 1112. In the case where the second distance d2 is greater than or equal to 1.6 μm, the technical effect of a narrow frame cannot be achieved.

For example, in combination with FIGS. 5 to 8, in the second direction Y, on the second side of the first touch electrode lead wire 111 along the second direction Y, there is a third distance d3 between the first lead-out part 1111 and the second lead-out part 1112, the first side and the second side are opposite sides, that is, on the two sides of the first touch electrode lead wire 111 along the second direction Y, there are distances between the corresponding the first lead-out part 1111 and the second lead-out part 1112. For example, in one example, the value range of the third distance d3 is 0.8 μm to 1.6 μm, and the third distance d3 may be 0.8 μm, 0.9 μm, 1 μm, 1.1 μm, 1.2 μm, 1.3 μm, 1.4 μm, 1.5 μm or 1.6 μm. For example, in the case where the third distance d3 is less than 0.8 μm, the distance between the first lead-out part 1111 and the second lead-out part 1112 is too small, so that the metal material remaining between the second lead-out part 1112 and the adjacent common signal line 108 cannot be completely prevented from electrically communicating the second lead-out part 1112 with the anti-interference signal line 116 adjacent to the second lead-out part 1112. In the case where the third distance d3 is greater than or equal to 1.6 μm, the technical effect of a narrow frame cannot be achieved.

Figure 9:
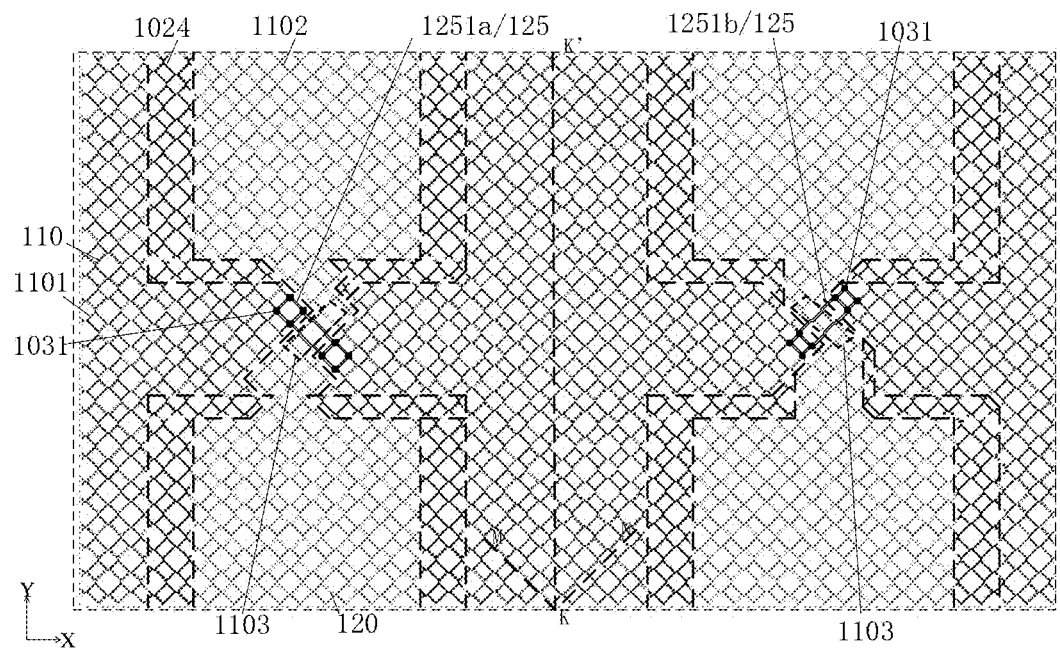
FIG. 9 is a schematic planar view of a touch control structure provided by at least one embodiment of the present disclosure.
Figure 10:
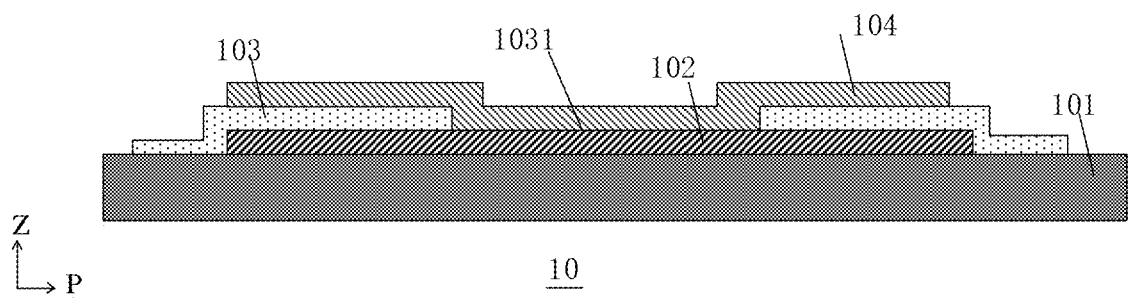
FIG. 10 is a schematic cross-sectional view of the touch control structure in FIG. 9.

For example, FIG. 9 is a schematic planar view of another touch control structure provided by at least one embodiment of the present disclosure, that is, FIG. 9 shows the planar structure of the first touch electrode 110 and the second touch electrode 120 that are spaced apart from each other in the touch region 100a in FIG. 7. FIG. 10 is a schematic cross-sectional view of the touch control structure in FIG. 9. As shown in FIGS. 7, 9 and 10, the touch control structure 10 includes a base substrate 101, a first metal layer 102 and a second metal layer 104 that are stacked on the base substrate 101, and an insulation layer 103 sandwiched between the first metal layer 102 and the second metal layer 104. The second metal layer 104 includes a plurality of first touch sub-electrodes 1101 arranged in sequence along the first direction X and spaced apart from each other, a plurality of second touch sub-electrodes 1102 and a plurality of connection electrodes 1103 that are arranged in sequence along the second direction Y, the first direction X intersects with the second direction Y, and the plurality of first touch sub-electrodes 1101 and the plurality of second touch sub-electrodes 1102 are spaced apart from each other; the second metal layer 104 includes a plurality of bridge electrodes 125 spaced apart from each other, and each of the plurality of bridge electrodes 125 is electrically connected with two first touch sub-electrodes 1101 adjacent to the bridge electrode 125 through a plurality of via structures 1031 in the insulation layer 103, to electrically connect any adjacent first touch sub-electrodes 1101, that is, the first touch sub-electrodes 1101 are sequentially connected through the bridge electrodes 125 to form a whole first touch electrode 110 extending in the first direction X. A plurality of second touch sub-electrodes 1102 and a plurality of connection electrodes 1103 are alternately distributed one by one and electrically connected in sequence to form a whole second touch electrode 120 extending along the second direction Y. Because there is an insulation layer 103 between the bridge electrode 125 and the connection electrode 1103, even if there is an overlapping part between the bridge electrode 125 and the connection electrode 1103 in planar view, the first touch electrode 110 and the second touch electrode 120 remain electrically insulated from each other.

For example, as shown in FIG. 9, the orthographic projection of each of the plurality of bridge electrodes 125 on the base substrate 101 intersects the orthographic projection of the corresponding connection electrode 1103 on the base substrate 101. Referring to FIGS. 9 and 10, the plurality of bridge electrodes 125 include a first bridge electrode 1251a and a second bridge electrode 1251b adjacent to each other, and the first bridge electrode 1251a and the second bridge electrode 1251b adjacent to each other are symmetrical about a straight line extending in the second direction Y. As shown in FIG. 9, the first bridge electrode 1251a and the second bridge electrode 1251b adjacent to each other are symmetrical about a straight line K-K', which is parallel to the axis Y. The extension directions of the first bridge electrode 1251a and the second bridge electrode 1251b adjacent to each other intersect with each other, that is, as shown in FIG. 9, the extension direction of the first bridge electrode 1251a and the extension direction of the straight line K-M are the same, the extension direction of the second bridge electrode 1251b and the extension direction of the straight line K-N are the same, and the straight line K-M and the straight line K-N intersect at position K, and the straight line K-M and the straight line K-N may be perpendicular to each other or not perpendicular to each other. In this way, on the basis of increasing the ratio of the mutual capacitance change $^{\Delta}Cm$ before and after finger touch to the capacitance Cm between the first touch electrode 110 (touch driving electrode) and the second touch electrode 120 (touch sensing electrode), the phenomenon of vanishing can be prevented.

For example, as shown in FIG. 9, the first direction X may be perpendicular to the second direction Y. In the case where the touch control structure provided by the embodiment of the present disclosure is applied to, for example, a touch display panel or a display device, the first direction X is the column direction of the sub-pixel array in the touch display panel or the display device, and the second direction Y is the row direction of the sub-pixel array in the touch display panel or the display device; alternatively, the first direction X is the row direction of the sub-pixel array in the touch display panel or the display device, and the second direction Y is the column direction of the sub-pixel array in the touch display panel or the display device, which is not limited by the embodiments of the present disclosure.

For example, as shown in FIG. 9, a plurality of first touch sub-electrodes 1101 are arranged along the first direction X, and the bridge electrode 125 is located between two adjacent first touch sub-electrodes 1101 in the first direction X, so that the adjacent two first touch sub-electrodes 1101 are electrically connected to each other through the bridge electrode 125. A plurality of second touch sub-electrodes 1102 are arranged along the second direction Y, and the connection electrode 1103 is located between two adjacent second touch sub-electrodes 1102 in the second direction Y, so that the adjacent two second touch sub-electrodes 1102 are electrically connected with each other through the connection electrode 1103. For example, the connection electrode 1103 is also arranged in the second metal layer 104. In one example, the connection electrode 1103, the first touch sub-electrode 1101 and the second touch sub-electrode 1102 are formed in the same process step, and the connection electrode 1103 and the second touch sub-electrode 1102 are formed into an integrated structure, but the connection electrode 1103 and the first touch sub-electrode 1101 are arranged at intervals.

It should be noted that, the number of the first touch sub-electrode 1101 and the bridge electrode 125 included in the first touch electrode 110 shown in FIG. 9 and the number of the second touch sub-electrode 1102 and the connection electrode 1103 included in the second touch electrode 120 are only illustrative, and the embodiments of the present disclosure do not specifically limit these aspects.

It should be noted that a body contour of the first touch sub-electrode 1101 in the first touch electrode 110 and a body contour of the second touch sub-electrode 1102 in the second touch electrode 120 shown in FIG. 9 can both be generally rectangular, while in other embodiments of the present disclosure, the outer outline shapes of the first touch sub-electrode 1101 and the second touch sub-electrode 1102 may also be, for example, triangular, rhombic, hexagonal, octagonal and strip-shaped and other regular shapes or irregular shapes. For example, the body contours of the first touch sub-electrode 1101 and the second touch sub-electrode 1102 may be the same or different from each other.

It should be noted that in other embodiments, two first touch sub-electrodes 1101 adjacent in the second direction Y may be connected by a bridge electrode, while two second touch sub-electrodes 1102 adjacent in the first direction X may be connected by, for example, a connection electrode which is located in the same layer as the second touch sub-electrodes 1102 and is integrally formed, that is, the electrical connection mode between two adjacent first touch sub-electrodes 1101 in the second direction Y and the electrical connection mode between two adjacent second touch sub-electrodes 1102 in the first direction X may be interchanged with each other.

For example, in some embodiments of the present disclosure, the first touch electrode 110 and the second touch electrode 120 are insulated from each other; the first touch electrode 110 may be a touch driving electrode and the second touch electrode 120 may be a touch sensing electrode; alternatively, the first touch electrode 110 may be a touch sensing electrode and the second touch electrode 120 may be a touch driving electrode, which is not limited by the embodiments of the present disclosure.

For example, in the case where the above-mentioned touch control structure is applied to, for example, a touch display panel or a display device, each first touch electrode 110 and each second touch electrode 120 may be electrically connected to a signal line, and connected to a touch controller or a touch integrated circuit through the signal line. Taking the case that the first touch electrode 110 is a touch sensing electrode and the second touch electrode 120 is a touch driving electrode as an example, the touch integrated circuit may be a touch chip, for example, configured to provide the touch driving signal to the second touch electrode 120, receive the touch sensing signal from the first touch electrode 110 and process the received touch sensing signal. For example, the processed data or signals are provided to the system controller to realize the touch sensing function. For example, one end of the signal line connected with the touch integrated circuit may be arranged at the same side of the touch region of the touch display panel to facilitate the connection with the touch integrated circuit, or, one signal line may be respectively arranged at two ends of one second touch electrode 120, and the touch integrated circuit can simultaneously input the touch driving signal (bilateral driving) to the one second touch electrode 120 through two signal lines during operation, so that the signal loading speed on the second touch electrode 120 can be improved, thereby improving the detection speed.

For example, in one example, with reference to FIGS. 7, 9 and 10, the base substrate 101 is a flexible base substrate, and the first metal layer 102 and the second metal layer 104 are disposed on the flexible base substrate. The first metal layer 102 includes a first touch electrode 110 (touch driving electrode) and a second touch electrode 120 (touch sensing electrode). Each first touch electrode 110 (touch driving electrode) and each second touch electrode 120 (touch sensing electrode) are respectively provided with a plurality of floating electrodes 1024, that is, the floating electrodes 1024 are arranged between the first touch sub-electrodes 1101 and the second touch sub-electrodes 1102 that are spaced from each other. The floating electrode 1024 is insulated from the first touch electrode 110 (touch driving electrode) and the second touch electrode 120 (touch sensing electrode), that is, the floating electrode 1024 is electrically insulated from a plurality of first touch sub-electrodes 1101 and a plurality of second touch sub-electrodes 1102, and is also insulated from the connection electrode 1103, the first bridge electrode 1251*a* and the second bridge electrode 1251*b*. The floating electrode 1024 is arranged in the same layer as the first touch electrode 110 and the second touch electrode 120, so that the plurality of first touch sub-electrodes 1101, the plurality of second touch sub-electrodes 1102, the connection electrode 1103, the first bridge electrode 1251*a*, the second bridge electrode 1251*b* and the floating electrode 1024 cover the whole touch region. Of course, the floating electrode 1024 may not be provided between the plurality of first touch sub-electrodes 1101 and the plurality of second touch sub-electrodes 1102, so as to keep a distance between the plurality of first touch sub-electrodes 1101 and the plurality of second touch sub-electrodes 1102, as long as the plurality of first touch sub-electrodes 1101 and the plurality of second touch sub-electrodes 1102 are electrically insulated.

For example, as shown in FIG. 10, in the third direction Z perpendicular to the main surface of the base substrate 101, the extension direction of the first bridge electrode 1251*a* is the fourth direction P on the plane parallel to the main surface of the base substrate 101, and a via structure 1031 is provided in the insulation layer 103, the first metal layer 102 is electrically connected with the second metal layer 104 through the via structure 1031 provided in the insulation layer 103. That is, the first touch sub-electrode 1101 is electrically connected with the first bridge electrode 1251*a* located in the lower layer through the via structure 1031 provided in the insulation layer 103, and two ends of the first bridge electrode 1251*a* are respectively connected with one first touch sub-electrode 1101, so that two adjacent first touch sub-electrodes 1101 are electrically connected through the first bridge electrode 1251*a*.

Figure 11:
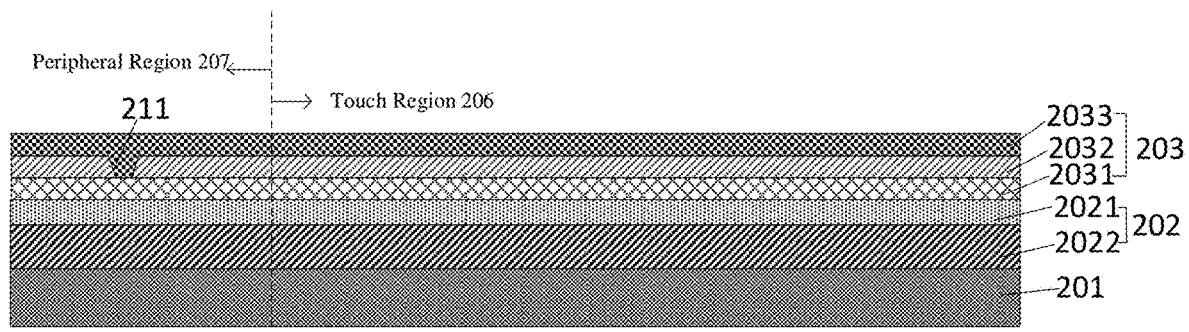
FIG. 11 is a schematic cross-sectional view of a touch display panel provided by at least one embodiment of the present disclosure.
Figure 12:
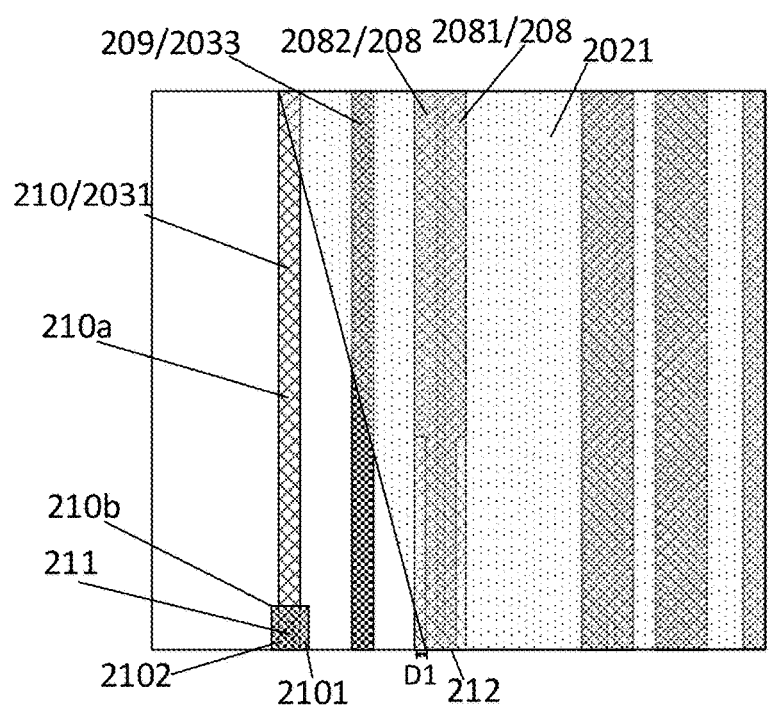
FIG. 12 is a schematic planar view of a touch display panel provided by at least one embodiment of the present disclosure.

At least one embodiment of the present disclosure further provides a touch display panel. For example, FIG. 11 is a schematic cross-sectional view of a touch display panel provided by at least one embodiment of the present disclosure, and FIG. 12 is a schematic planar view of a touch display panel provided by at least one embodiment of the present disclosure. With reference to FIG. 11 and FIG. 12, the touch display panel includes a base substrate 201, a display structure 202 and a touch control structure 203 that are sequentially stacked on the base substrate 201, the display structure 202 includes a display panel 2022 and a planarization layer 2021, the touch control structure 203 includes a first metal layer 2031, an insulation layer 2032 and a second metal layer 2033 that are sequentially stacked on the display structure 202, and on the plane parallel to the main surface of the base substrate 201, the touch control structure 203 is divided into a touch region 206 and a peripheral region 207 surrounding the touch region 206.

For example, in one example, the touch display panel further comprises a pixel defining layer disposed on the first electrode of the light-emitting element, and a plurality of openings are formed in the pixel defining layer to expose the first electrodes of a plurality of sub-pixels respectively, thereby defining the pixel opening region of each sub-pixel, and the light-emitting layer of each sub-pixel is formed in the pixel opening region, and the second electrode may be a common electrode, that is, a plurality of sub-pixels share a common electrode.

For example, in one example, the touch display panel further comprises an encapsulation layer located between the light-emitting element and the touch substrate, and the encapsulation layer is configured to seal the light-emitting element to prevent external moisture and oxygen from infiltrating into the light-emitting element and the driving circuit to cause damage to devices such as the light-emitting element. For example, the encapsulation layer may be a single-layer structure or a multi-layer structure. For example, the encapsulation layer includes an organic film, an inorganic film, or a multilayer structure including organic films and inorganic films alternately stacked. In the case where the encapsulation layer includes a multilayer structure in which an organic film(s) and an inorganic film(s) are alternately stacked, it can better prevent external water vapor from penetrating into the inside of the light-emitting element.

For example, in one example, the touch display panel further comprises a buffer layer between the display structure 202 and the touch control structure 203. For example, the buffer layer is formed on the encapsulation layer to improve the adhesion between the display structure 202 and the touch control structure 203. For example, the buffer layer may be an inorganic insulation layer. For example, the material of the buffer layer may be silicon nitride, or silicon oxide, or silicon oxynitride, etc. For example, the buffer layer may also include a structure in which a silicon oxide layer(s) and a silicon nitride layer(s) are alternately stacked.

It should be noted that in a Flexible Multi-layer On Cell (FMLOC) touch control structure, the base substrate may be used as a buffer layer without providing an additional buffer layer.

It should be noted that the display panel 2022 may be a commonly used OLED display panel, and the layer structure included in the display panel may be refer to the conventional design, which is not repeated here. The positional relationship between the planarization layer 2021 and the display panel 2022 is not limited to the stacked positional relationship in FIG. 11, but may be a layer structure in which the planarization layer 2021 is included in the display panel 2022, which is not limited by the embodiments of the present disclosure.

Figure 13:
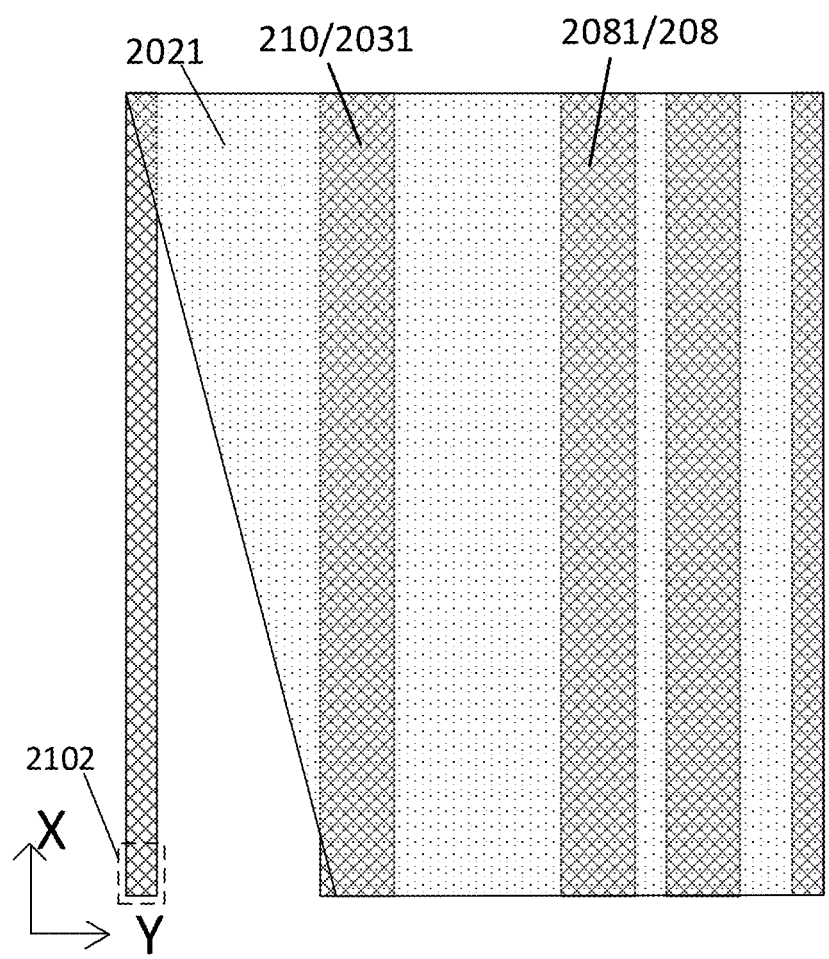
FIG. 13 is a view showing a layout structure of the single layer of the first metal layer and the planar structure of the planarization layer.
Figure 14:
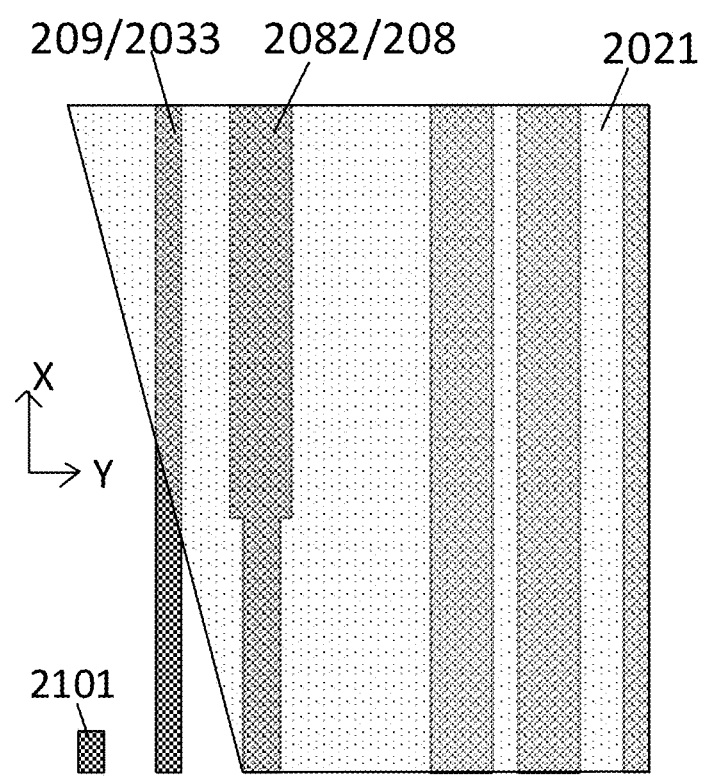
FIG. 14 is a view showing a layout structure of the single layer of the second metal layer and the planar structure of the planarization layer.

FIG. 13 is a view showing a layout structure of the single layer of the first metal layer and the planar structure of the planarization layer, and FIG. 14 is a view showing a layout structure of the single layer of the second metal layer and the planar structure of the planarization layer. Combining with FIGS. 11 to 14, along the direction from the touch region 206 to the peripheral region 207, the peripheral region 207 includes a common signal line 208, a first detection line 209 and a second detection line 210 which are arranged in sequence and spaced from each other. The orthographic projection of the edge of the planarization layer 2021 on the base substrate 201 intersects with the orthographic projection of the first detection line 209 on the base substrate 201 and the orthographic projection of the second detection line 210 on the base substrate 201, and intersects with the orthographic projection of part of common signal lines 208 on the base substrate 201; the first detection line 209 is disposed in the second metal layer 2033, and the overlapping part 210*a* of the second detection line 210 is disposed in the first metal layer 2031. The overlapping part 210*a* of the second detection line 210 is set to a single-layer structure in the first metal layer 2031, and the first detection line 209 is set to a single-layer structure in the second metal layer 2033, the orthographic projection of the overlapping part 210*a* of the second detection line 210 on the base substrate 201 overlaps the orthographic projection of the edge of the planarization layer 2021 on the base substrate 201. Because the overlapping part 210*a* of the second detection line 210 and the first detection line 209 are arranged in different layer structures, and the insulation layer 2032 is arranged between the two layer structures, even if the material of the first metal layer or the material of the second metal layer remains at the boundary of the planarization layer 2021, the problem of short circuit caused by electrical communication between the first detection line 209 and the second detection line 210 will not occur, so that the short circuit phenomenon between the first detection line 209 and the second detection line 210 adjacent to each other can be prevented by the above structural design.

For example, the direction parallel to the X-axis is the first direction, the direction parallel to the Y-axis is the second direction, and the direction perpendicular to the planes where the X-axis and the Y-axis are located is the third direction Z.

For example, as shown in FIGS. 11 and 12, the first end 210*b* of the second detection line 210 includes a first detection part 2101 disposed in the second metal layer 2033 and a second detection part 2102 disposed in the first metal layer 2031, and the first detection part 2101 and the second detection part 2102 are electrically connected through a first via structure 211 penetrating through the insulation layer 2032.

For example, as shown in FIG. 12, the common signal line 208 includes a first sub-common signal line 2081 and a second sub-common signal line 2082 which are stacked, the first sub-common signal line 2081 is arranged in the first metal layer 2031 and the second sub-common signal line 2082 is arranged in the second metal layer 2033. The first sub-common signal line 2081 and the second sub-common signal line 2082 are electrically connected through the second via structure 212 arranged in the insulation layer 2032, and at least at the position where the common signal line 208 overlaps the edge of the planarization layer 2021, the orthographic projection of the first sub-common signal line 2081 on the base substrate 201 is within the orthographic projection of the second sub-common signal line 2082 on the base substrate 201, and a first distance D1 is between at least a part of the edge of the second sub-common signal line 2082 close to the first detection line 209 and the edge of the first sub-common signal line 2081 close to the first detection line 209. That is, at least part of the edge of the second sub-common signal line 2082 close to the first detection line 209 and the edge of the first sub-common signal line 2081 close to the first detection line 209 are not aligned, which can widen the distance between the first detection line 209 and at least part of the second sub-common signal line 2082, and the boundary of the organic layer does not intersect with the lower part of the second sub-common signal line 2082 due to the retraction of the second sub-common signal line 2082. Therefore, the remaining of the material of the second metal layer can be reduced, so that the risk of conduction between the first detection line 209 and the second sub-common signal line 2082 can be reduced, and further, the electrical connection between the common signal line 208 and the first detection line 209 can be avoided. In addition, even if the material of the second metal layer 2033 forming the second sub-common signal line 2082 falls between the second sub-common signal line 2082 and the first detection line 209, because the distance between the first detection line 209 and at least part of the second sub-common signal line 2082 is increased, the material of the remaining second metal layer 2033 is mostly scattered and discontinuous, so that the material of the discontinuous second metal layer 2033 will not electrically connect the second sub-common signal line 2082 and the first detection line 209.

It should be noted that in FIG. 12, there is also a distance between part of the edge of the second sub-common signal line 2082 away from the first detection line 209 and part of the edge of the first sub-common signal line 2081 away from the first detection line 209, but the embodiment of the present disclosure is not limited to this case, and the entire edge of the second sub-common signal line 2082 away from the first detection line 209 and the entire edge of the first sub-common signal line 2081 away from the first detection line 209 may be aligned, which is not limited by the embodiment of the present disclosure.

It should also be noted that in FIG. 12, a distance D1 is between the lower part of the edge of the second sub-common signal line 2082 close to the first detection line 209 and the lower part of the edge of the first sub-common signal line 2081 close to the first detection line 209. In other examples, a first distance D1 may be between the entire edge of the second sub-common signal line 2082 close to the first detection line 209 and the entire edge of the first sub-common signal line 2081 close to the first detection line 209. In still other examples, it can also be that there is a first distance D1 between the lower edge of the second sub-common signal line 2082 close to the first detection line 209 and the lower edge of the first sub-common signal line 2081 close to the first detection line 209, and the entire edge of the second sub-common signal line 2082 away from the first detection line 209 and the entire edge of the first sub-common signal line 2081 away from the first detection line 209 may be aligned, so that the problem that the material of the second metal layer 104 remains at the position corresponding to the edge of the organic layer to cause short circuit can be avoided. The organic layer is a layer structure existing in the basic display panel, but it does not exist in the touch control structure. In the case where the touch control structure and the basic display panel are stacked, the organic layer will affect the subsequent formation of the first metal layer and the second metal layer. Here, the organic layer is not separately described, but can be a planarization layer 2021. For specific features of the organic layer, please refer to the following description of the planarization layer 2021.

For example, in one example, the first distance D1 between at least part of the edge of the second sub-common signal line 2082 close to the first detection line 209 and the edge of the first sub-common signal line 2081 close to the first detection line 209 is greater than 0.8 μm and less than 1.6 μm. For example, the first distance D1 may be 0.9 μm, 1 μm, 1.1 μm, 1.2 μm, 1.3 μm, 1.4 μm or 1.5 μm. In the case where the first distance D1 is less than or equal to 0.8 μm, the distance between at least part of the edge of the second sub-common signal line 2082 close to the first detection line 209 and the edge of the first sub-common signal line 2081 close to the first detection line 209 is too small, so that it is impossible to completely avoid the metal material remaining between the first detection line 209 and the second sub-common signal line 2082 from electrically communicating the first detection line 209 and the second sub-common signal line 2082. In the case where the first distance D1 is greater than or equal to 1.6 μm, the technical effect of narrow frame cannot be achieved.

Figure 15:
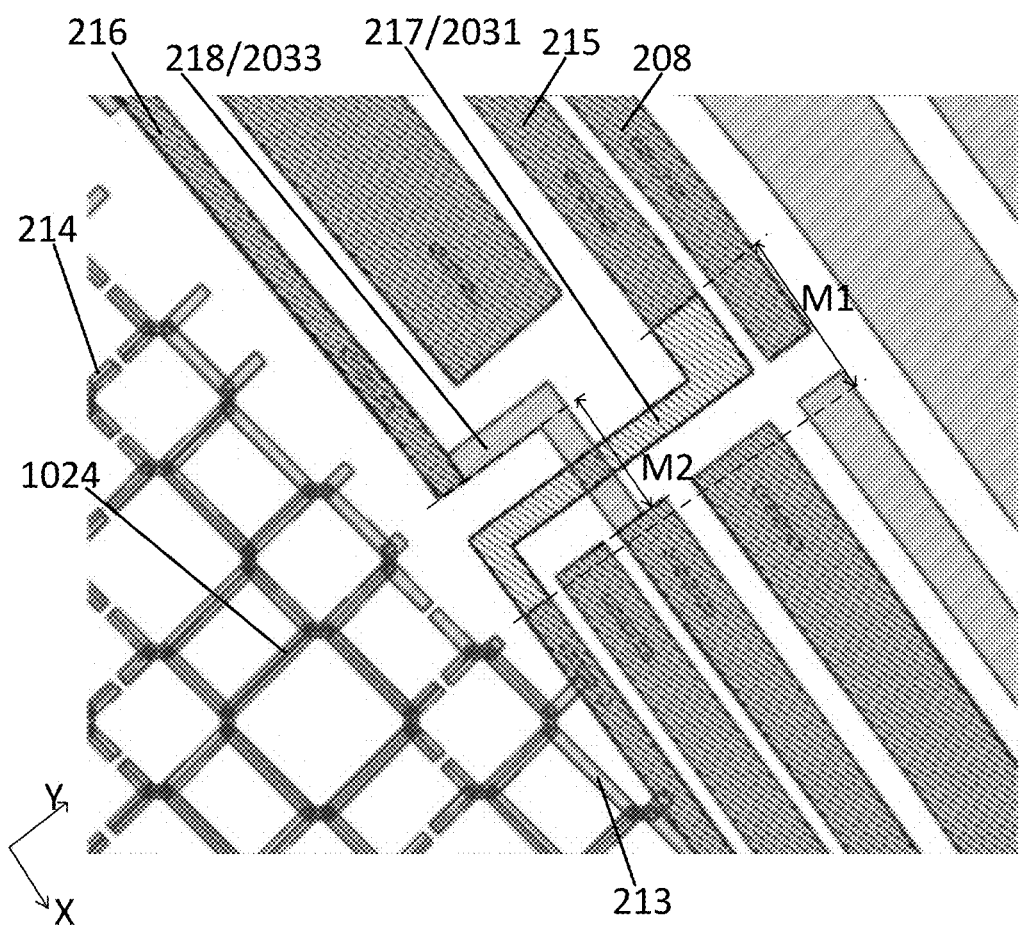
FIG. 15 is a schematic planar view of the touch control structure of the touch display panel provided by at least one embodiment of the present disclosure.
Figure 16:
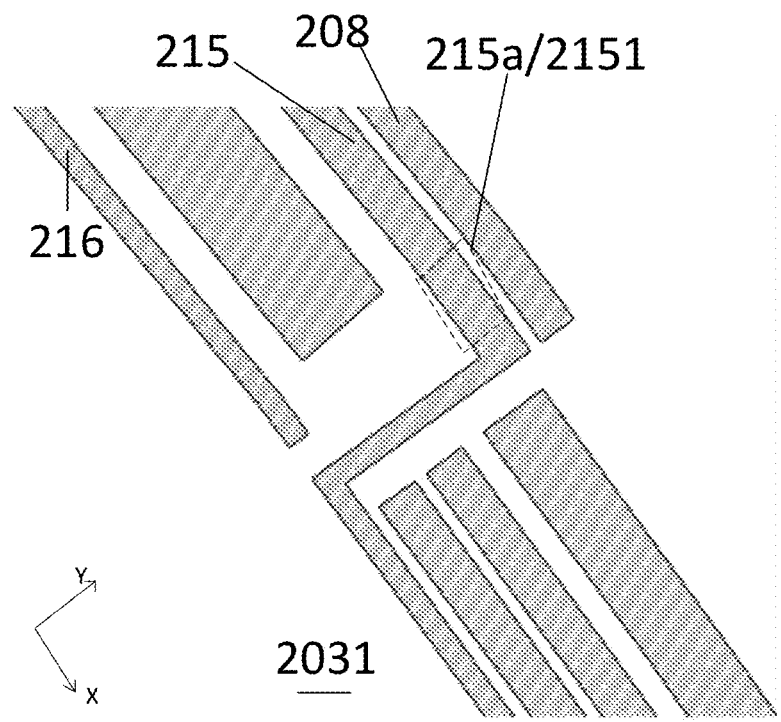
FIG. 16 is a view showing a layout of the planar structure of the single layer of the first metal layer in FIG. 15.
Figure 17:
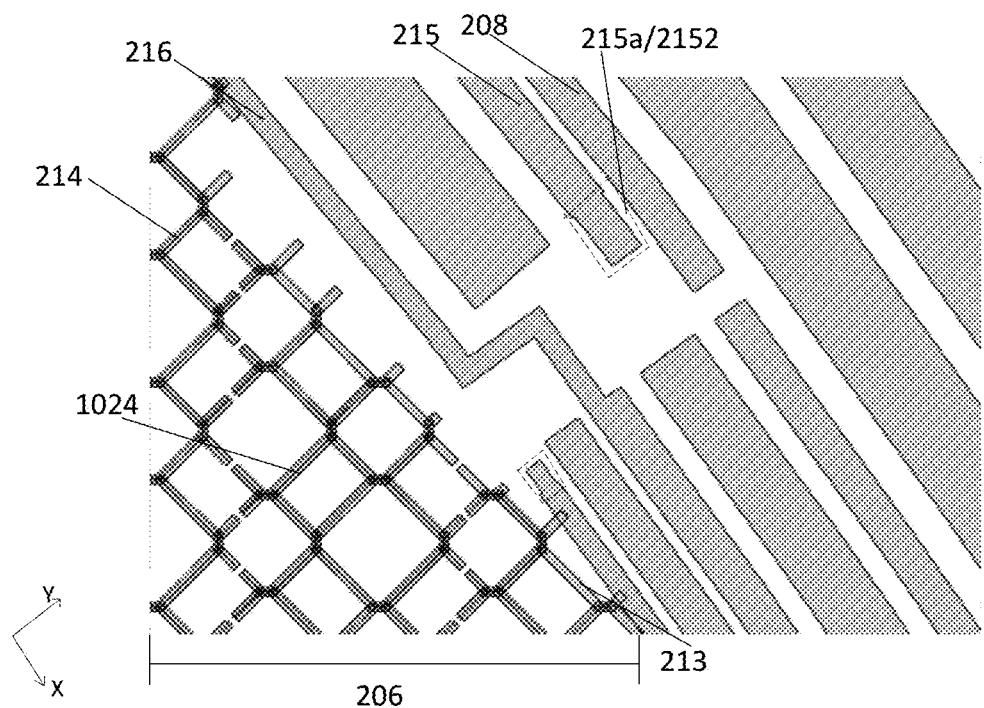
FIG. 17 is a view showing a layout of the planar structure of the single layer of the second metal layer in FIG. 15.

For example, FIG. 15 is a schematic planar view of the touch control structure of the touch display panel provided by at least one embodiment of the present disclosure, FIG. 16 is a view showing a layout of the planar structure of the single layer of the first metal layer in FIG. 15, and FIG. 17 is a view showing a layout of the planar structure of the single layer of the second metal layer in FIG. 15. As shown in FIG. 17, the touch region 206 is provided with a first touch electrode 213 and a second touch electrode 214 spaced apart from each other. For example, the related features of the first touch electrode 213 and the second touch electrode 214 may be found in the above descriptions of the first touch electrode 110 and the second touch electrode 120, and will not be repeated herein.

For example, in combination with FIG. 15 to FIG. 17, a first touch electrode lead wire 215 and a second touch electrode lead wire 216 are arranged on the side of the common signal line 208 close to the touch region 206, the first touch electrode lead wire 215 is electrically connected with the first touch electrode 213, and the second touch electrode lead wire 216 is electrically connected with the second touch electrode 214, and the extension direction of the second touch electrode lead wire 216 is parallel to that of the common signal line 208. Two first touch electrode lead wires 215 adjacent to each other in the extension direction of the first touch electrode lead wires 215 are electrically connected by a first connection line 217, and two second touch electrode lead wires 216 adjacent to each other in the extension direction of the second touch electrode lead wires 216 are electrically connected by a second connection line 218. One of the first connection line 217 and the second connection line 218 is only provided in the first metal layer 2031, and the other one is only arranged in the second metal layer 2033, and the orthographic projection of the first connection line 217 on the base substrate 201 and the orthographic projection of the second connection line 218 on the base substrate 201 at least partially overlap with each other. For example, in FIG. 15, the first connection line 217 is only arranged in the first metal layer 2031, and the second connection line 218 is only arranged in the second metal layer 2033, and on the plane parallel to the base substrate 201, the planar shapes of the first connection line 217 and the second connection line 218 are both folded lines. The related features of the first connection line 217 and the second connection line 218 may also be referred to the related descriptions of the first connection line 113 and the second connection line 114, which will not be repeated herein.

Figure 18:
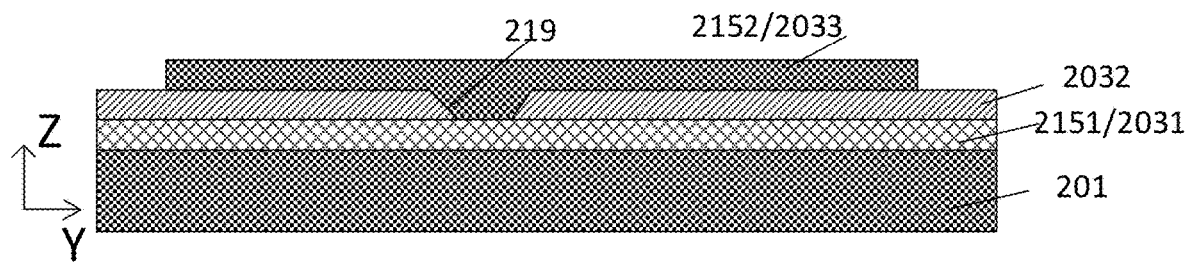
FIG. 18 is a schematic cross-sectional view of a second end provided by at least one embodiment of the present disclosure.

For example, FIG. 18 is a schematic cross-sectional view of a second end provided by at least one embodiment of the present disclosure. As shown in FIGS. 15 and 18, the ends of two adjacent first touch electrode lead wires 215 close to each other are second ends 215a, and the second end 215a includes a first lead-out part 2151 and a second lead-out part 2152 which are sequentially stacked on the base substrate 201. The first lead-out part 2151 and the second lead-out part 2152 are electrically connected through a third via structure 219 arranged in the insulation layer 2032, the first lead-out part 2151 only includes a part located in the first metal layer 2031, and the second lead-out part 2152 only includes a part located in the second metal layer 2033. The orthographic projection of the second lead-out part 2152 on the base substrate 201 is within the orthographic projection of the first lead-out part 2151 on the base substrate 201, and the area of the orthographic projection of the second lead-out part 2152 on the base substrate 201 is smaller than that of the orthographic projection of the first lead-out part 2151 on the base substrate 201. That is, in FIG. 18, the distances are provided in two ends of each of the first lead-out part 2151 and the second lead-out part 2152. The second lead-out part 2152 and the first lead-out part 2151 may be referred to the above-mentioned related descriptions, which are not described herein.

For example, as shown in FIG. 15, the distance between two adjacent first touch electrode lead wires 215 in the first direction X is greater than that between two adjacent second touch electrode lead wires 216 in the first direction X. For example, in FIG. 15, the distance between two adjacent first touch electrode lead wires 215 in the first direction X is M1, and the distance between two adjacent second touch electrode lead wires 216 in the first direction X is M2, it can be seen from FIG. 15 that M1 is obviously larger than M2. That is, the length of the first touch electrode lead-out wire 215 in the first direction X is shortened, and it is retracted, in this way, the distance, in the first direction X, between the two adjacent first touch electrode lead-out wires 215 and the part of the second touch electrode lead-out wire 216 disposed in the second metal 2033 is larger, so that the risk of short circuit between the first touch electrode lead-out wire 215 and the second touch electrode lead-out wire 216 can be reduced.

For example, as shown in FIGS. 15 and 17, a floating electrode 1024 is further arranged between the first touch electrode 213 (touch driving electrode) and the second touch sensing electrode 214 (touch sensing electrode). The first touch electrode 213 includes a plurality of first touch sub-electrodes, and the second touch electrode 214 includes a plurality of second touch sub-electrodes, that is, the floating electrode 1024, spaced apart from both the first touch sub-electrode and second touch sub-electrode, is arranged between the first touch sub-electrode and second touch sub-electrode that are spaced apart from each other. The floating electrode 1024 is insulated from the first touch electrode 213 (touch driving electrode) and the second touch electrode 214 (touch sensing electrode).

For example, in one example, with reference to FIG. 11, the display structure 202 includes an organic light-emitting display panel, which includes a pixel circuit layer, an organic light-emitting layer and an encapsulation layer arranged in sequence, and the touch control structure 203 is arranged on the side of the encapsulation layer away from the organic light-emitting layer. The structure of the organic light-emitting display panel may be referred to the conventional design, which will not be described herein.

For example, the embodiment of the present disclosure takes the touch display panel as an OLED touch display panel as an example. For example, the OLED touch display panel may be an. On-cell touch display panel or an In-cell touch display panel. Of course, in other embodiments of the present disclosure, the touch display panel can also be a liquid crystal touch display panel, and the embodiments of the present disclosure do not limit the specific types of display panels using the touch substrate provided by the embodiments of the present disclosure.

For example, the touch display panel is an OLED touch display panel, and the plurality of sub-pixels may include green sub-pixels, red sub-pixels or blue sub-pixels. Each sub-pixel includes a light-emitting element and a pixel driving circuit for driving the light-emitting element to emit light. The embodiments of the present disclosure do not restrict the types and specific compositions of the pixel driving circuit. For example, the pixel driving circuit may be current-driven or voltage-driven, 2T1C driving circuit (i.e., two transistors and a capacitor, which includes a driving transistor and a data writing transistor), and may further include a compensation circuit (compensation transistor), a light emission control circuit (light emission control transistor), a reset circuit (reset transistor) and the like on the basis of 2T1C driving circuit.

Figure 19:
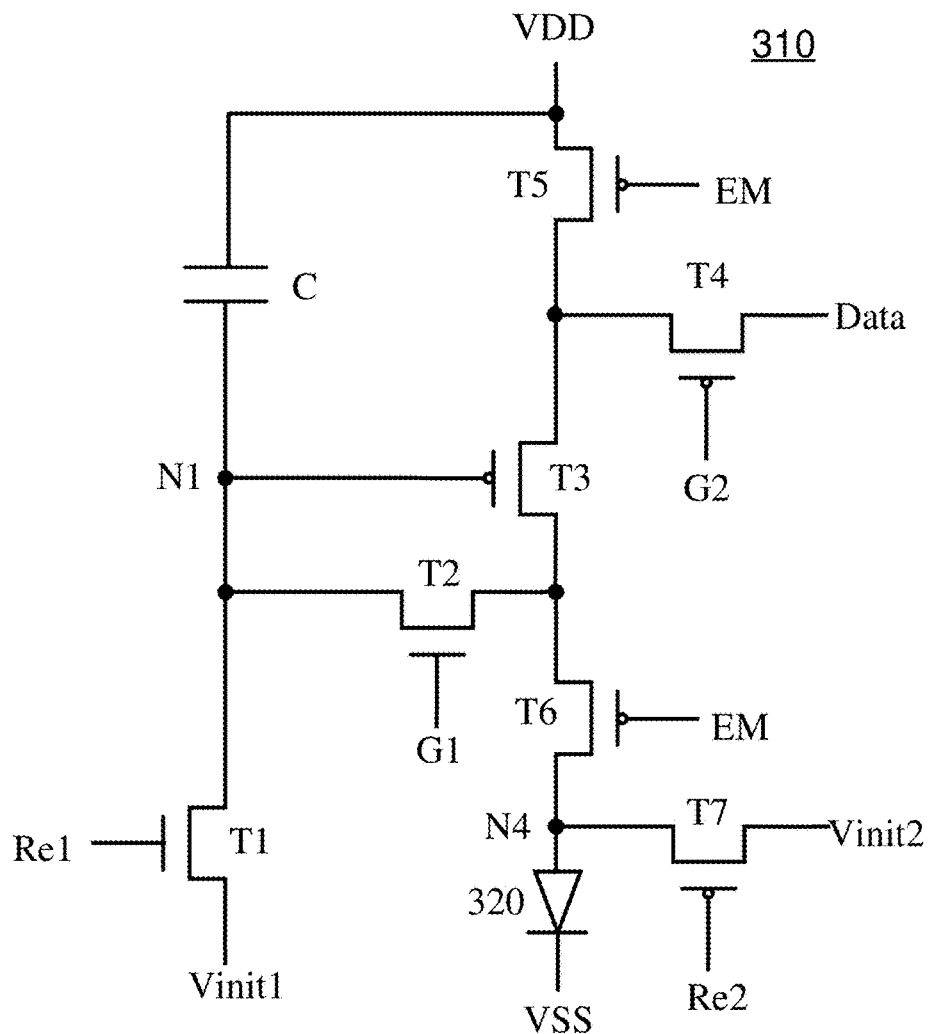
FIG. 19 is a schematic circuit structure diagram of a pixel circuit provided by at least one embodiment of the present disclosure.

For example, in one example, the pixel driving circuit is 7T1C driving circuit. For example, FIG. 19 is a schematic circuit structure diagram of a pixel circuit provided by at least one embodiment of the present disclosure. As shown in FIG. 19, the pixel circuit 310 includes a first transistor T1, a second transistor T2, a driving transistor T3, a fourth transistor T4, a fifth transistor T5, a sixth transistor T6, a seventh transistor T7 and a storage capacitor C.

For example, as shown in FIG. 19, the first transistor T1 is the first reset transistor T1, the second transistor T2 is the threshold compensation transistor T2, the fourth transistor T4 is the data writing transistor T4, the fifth transistor T5 is the second light emission control transistor T5, the sixth transistor T6 is the first light emission control transistor T6, and the seventh transistor T7 is the second reset control transistor T7.

For example, the first electrode of the first transistor T1 is connected to the node N1, that is, it is electrically connected to the gate of the driving transistor T3; the second electrode of the first transistor T1 is connected to the first initial signal terminal Vinit1, that is, electrically connected to the first reset signal terminal Re1, that is, electrically connected to the reset control signal line to receive the reset control signal; the first electrode of the second transistor T2, that is, the threshold compensation transistor, is connected to the node N1, that is, electrically connected to the gate of the driving transistor T3, and the second electrode of the second transistor T2 is connected to the first gate driving signal terminal G1 to receive the compensation control signal; the gate of the driving transistor T3 is connected to the node N1 to be connected with the first plate of the storage capacitor C, the first electrode of the first transistor T1 and the first electrode of the second transistor T2; the first electrode of the fourth transistor T4, that is, the data writing transistor, is connected to the data signal terminal DATA to receive the data signal, the second electrode of the fourth transistor T4 is connected to the first electrode of the driving transistor T3, and the gate of the fourth transistor T4 is connected to the second gate driving signal terminal G2 to receive the scanning signal; the first electrode of the fifth transistor T5, that is, the second light emission control transistor, is connected to the first power supply terminal VDD to receive the first power supply signal, the second electrode of the fifth transistor T5 is connected to the first electrode of the driving transistor T3, and the gate of the fifth transistor T5 is connected to the light emission control signal terminal EM to receive the light emission control signal; the first electrode of the sixth transistor T6, that is, the first light-emitting control transistor, is connected to the second electrode of the driving transistor T3, the second electrode of the sixth transistor T6 is connected to the first electrode of the seventh transistor T7, and the gate of the sixth transistor T6 is connected to the light-emitting control signal terminal EM to receive the light-emitting control signal; the second electrode of the seventh transistor T7 is connected to the second initial signal terminal Vinit2, that is, electrically connected to the second reset power signal line to receive the reset signal Vinit, and the gate of the seventh transistor T7 is connected to the second reset signal terminal Re2, that is, electrically connected to the reset control signal line to receive the reset control signal; the first plate of the storage capacitor C is connected to the node N1 and electrically connected to the gate of the driving transistor T3, and the second plate of the storage capacitor C is connected to the first power supply terminal VDD, that is, connected to the first power supply signal line. The pixel circuit may be connected with a light-emitting element 320, the light-emitting element 320 may be an organic light-emitting diode (OLED), and the pixel circuit is configured to drive the light-emitting element 320 to emit light, and the light-emitting element 320 may be connected between the second electrode of the sixth transistor T6 and the second power supply terminal VSS, that is, the second power supply signal line.

For example, the first power signal line refers to a signal line that outputs a voltage signal VDD, and can be connected to a voltage source to output a constant voltage signal, such as a positive voltage signal. The second power signal line refers to a signal line that outputs a voltage signal VSS, and can be connected with a voltage source to output a constant voltage signal, such as a negative voltage signal.

For example, the scanning signal and the compensation control signal may be the same, that is, the gate of the data writing transistor T4 and the gate of the threshold compensation transistor T2 may be electrically connected to the same signal line to receive the same signal, so as to reduce the number of signal lines. For example, the gate of the data writing transistor T4 and the gate of the threshold compensation transistor T2 may also be electrically connected to different signal lines respectively, that is, the gate of the data writing transistor T4 is electrically connected to the second scanning signal line (second gate line), and the gate of the threshold compensation transistor T2 is electrically connected to the first scanning signal line (first gate line), and the signals transmitted by the first scanning signal line and the second scanning signal line can be the same line or different lines, so that the gate of the data writing transistor T4 and the gate of the threshold compensation transistor T2 can be separately and independently controlled, so that the flexibility of controlling the pixel circuit can be increased.

For example, the first light emission control transistor T6 and the second light emission control transistor T5 may be input the same light emission control signal, that is, the gate of the first light emission control transistor T6 and the gate of the second light emission control transistor T5 may be electrically connected to the same signal line to receive the same signal, thereby reducing the number of the signal lines. For example, the gates of the first light-emitting control transistor T6 and the second light-emitting control transistor T5 may be electrically connected to different light-emitting control signal lines, respectively. It this case, the signals transmitted by different light-emitting control signal lines may be the same or different.

For example, the reset control signals input to the second reset transistor T7 and the first reset transistor T1 may be the same, that is, the gate of the second reset transistor T7 and the gate of the first reset transistor T1 may be electrically connected to the same signal line to receive the same signal, thereby reducing the number of signal lines. For example, the gate of the second reset transistor T7 and the gate of the first reset transistor T1 may be electrically connected to different reset control signal lines, respectively, in this case, the signals on different reset control signal lines may be the same or different.

For example, the first transistor T1 and the second transistor T2 may be N-type transistors. For example, the first transistor T1 and the second transistor T2 may be N-type metal oxide transistors, and the N-type metal oxide transistors have smaller leakage current, so that the problem that the node N1 leaks electricity through the first transistor T1 and the second transistor T2 in the light-emitting stage can be avoided. Meanwhile, the driving transistor T3, the fourth transistor T4, the fifth transistor T5, the sixth transistor T6, and the seventh transistor T7 may be P-type transistors, for example, the driving transistor T3, the fourth transistor T4, the fifth transistor T5, the sixth transistor T6, and the seventh transistor T7 may be P-type low-temperature polycrystalline silicon transistors, and the P-type low-temperature polycrystalline silicon transistors have higher carrier mobility, thus being beneficial to realizing a display panel with high resolution, high reaction speed, high pixel density, and high opening rate. The first initial signal terminal Vinit1 and the second initial signal terminal Vinit2 can output the same or different voltage signals according to the actual situation.

Figure 20:
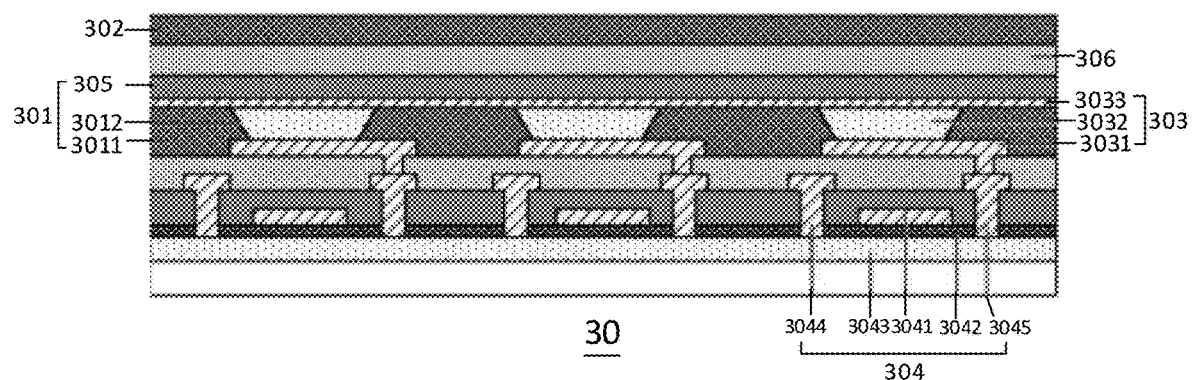
FIG. 20 is a schematic cross-sectional view of a thin film transistor directly electrically connected to a light-emitting element in a pixel driving circuit provided by at least one embodiment of the present disclosure.

For the sake of clarity, FIG. 20 is a schematic cross-sectional structure diagram of a thin film transistor directly electrically connected to a light-emitting element in a pixel driving circuit provided by at least one embodiment of the present disclosure. The thin film transistor 304 may be a driving transistor, and is configured to work in a saturated state and control the magnitude of current driving the light-emitting element 303 to emit light. For example, the thin film transistor 304 may also be a light emission control transistor for controlling whether the current driving the light-emitting element 303 to emit light flows. Embodiments of the present disclosure do not limit the specific types of the thin film transistors.

For example, the light-emitting element 303 is an organic light-emitting diode and includes a first electrode 3031, a light-emitting layer 3032 and a second electrode 3033. One of the first electrode 3031 and the second electrode 3033 is an anode and the other is a cathode. For example, the first electrode 3031 is an anode and the second electrode 3033 is a cathode. For example, the light-emitting layer 3032 is an organic light-emitting layer or a quantum dot light-emitting layer. For example, the light-emitting element 303 may include auxiliary functional layers such as a hole injection layer, a hole transport layer, an electron injection layer and an electron transport layer in addition to the light-emitting layer 3032. For example, the light-emitting element 303 may have a top emission structure, and the first electrode 3031 is reflective and the second electrode 3033 is transmissive or semi-transmissive. For example, the first electrode 3031 is made of a material with high work function to act as an anode, such as ITO/Ag/ITO laminated structure; the second electrode 3033 is made of a material with a low work function to act as a cathode, for example, a semi-transparent metal or a metal alloy material, for example, an Ag/Mg alloy material.

For example, the thin film transistor 304 includes a gate electrode 3041, a gate insulation layer 3042, an active layer 3043, a first source-drain electrode 3044, and a second source-drain electrode 3045, the second source-drain electrode 3045 is electrically connected to the first electrode 3031 of the light-emitting element 303. The embodiment of the present disclosure does not limit the type, material, structure, etc. of the thin film transistor 304, for example, it may be a top gate type, a bottom gate type, etc. For example, the active layer 3043 of the thin film transistor 304 may be amorphous silicon, polysilicon (low temperature polysilicon and high temperature polysilicon), oxide semiconductor (for example, indium gallium tin oxide (IGZO)) and the like. For example, the thin film transistor 304 may be an N-type transistor or a P-type transistor.

The transistors (for example, the thin film transistor 304) used in the embodiments of the present disclosure may all be thin film transistors, field effect transistors or other switching devices with the same characteristics, and all the embodiments of the present disclosure are described by taking the case where this transistor is a thin film transistor as an example. The source electrode and the drain electrode of a transistor adopted by the embodiments of the present disclosure may be symmetrical in structure, so there may be no difference in structure between the source electrode and the drain electrode of the transistor. In the embodiment of the present disclosure, in order to distinguish the two electrodes of the transistor, except the gate, one of the two electrodes is directly described as the first source-drain electrode and the other as the second source-drain electrode.

For example, the touch display panel 30 provided by the embodiment of the present disclosure has both a touch function and a display function, and has all the technical effects of the touch substrate provided by the above embodiments of the present disclosure, so the technical effects of the touch display panel are not repeated herein.

At least one embodiment of the present disclosure further provides an electronic device which includes the touch control structure or the touch display panel provided by any one of the above embodiments of the present disclosure. For example, the electronic device may include the touch display panel 30.

Figure 21:
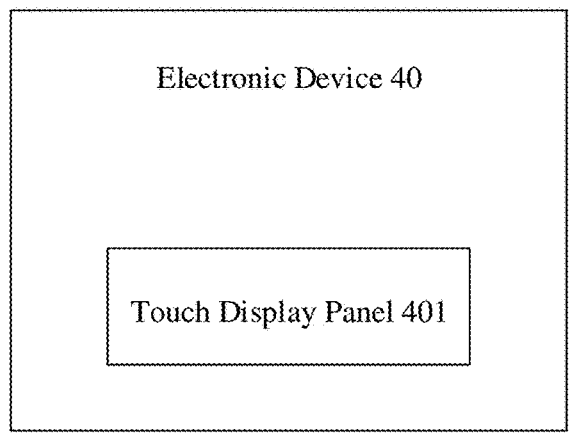
FIG. 21 is a schematic block diagram of an electronic device provided by at least one embodiment of the present disclosure.

For example, FIG. 21 is a schematic block diagram of an electronic device provided by at least one embodiment of the present disclosure. For example, as shown in FIG. 21, the electronic device 40 includes a touch display panel 401. For example, the touch display panel 401 may be the touch display panel provided by any one of the embodiments of the present disclosure.

For example, the electronic device 40 may be a display device or a display apparatus with a display function and a touch function. For example, the electronic device 40 may be a display, an OLED display panel, an OLED TV, a liquid crystal display panel, a liquid crystal display TV, a QLED display panel, a QLED TV, an electronic paper, a mobile phone, a tablet computer, a notebook computer, a digital photo frame, a navigator and other products or components with display function and touch function.

The touch control structure, the touch display panel and the electronic device provided by at least one embodiment of the present disclosure have at least one of the following beneficial technical effects:

(1) In the touch control structure provided by at least one embodiment of the present disclosure, the overlapping part of the second detection line and the first detection line are arranged in different layer structures, and an insulation layer is further arranged between the two layer structures. Even if the material of the first metal layer or the material of the second metal layer remains at the boundary of the organic layer, the problem of short circuit caused by electrical communication between the first detection line and the second detection line will not occur.

(2) In the touch control structure provided by at least one embodiment of the present disclosure, at least part of the edge of the first sub-common signal line close to the first detection line and the edge of the second sub-common signal line close to the first detection line are not aligned, so that the distance between the first detection line and at least part of the second sub-common signal line can be widened, and the boundary of the organic layer does not intersect with the lower part of the second sub-common signal line due to the retraction of the second sub-common signal line. Therefore, the material residue of the second metal layer can be reduced, so that the risk of conduction between the first detection line and the second sub-common signal line can be reduced, and further, the electrical connection between the common signal line and the first detection line can be avoided. In addition, even if the material of the second metal layer forming the second sub-common signal line falls between the second sub-common signal line and the first detection line, because the distance between the first detection line and at least part of the second sub-common signal line is increased, the material of the remaining second metal layer is mostly scattered and discontinuous, so that the material of the discontinuous second metal layer will not electrically connect the second sub-common signal line and the first detection line.

The following statements should be noted:

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness and size of a layer or a structure may be enlarged or narrowed, that is, the drawings are not drawn in a real scale.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A touch control structure comprising:
   a base substrate;
   a first metal layer, an insulation layer and a second metal layer that are sequentially stacked on the base substrate, wherein
   on a plane parallel to a main surface of the base substrate, the touch control structure is divided into a touch region and a peripheral region surrounding the touch region, and along a direction from the touch region to the peripheral region, the peripheral region comprises a first detection line and a second detection line that are sequentially arranged and spaced apart from each other;
   the first detection line is arranged in the second metal layer, an overlapping part of the second detection line is arranged in the first metal layer, a first end of the second detection line comprises a first detection part arranged in the second metal layer and a second detection part arranged in the first metal layer, and the first detection part is electrically connected with the second detection part through a first via structure penetrating through the insulation layer;
   the touch control structure further comprises a common signal line on a side of the first detection line close to the touch region, and the common signal line comprises a first sub-common signal line and a second sub-common signal line that are stacked, the first sub-common signal line is in the first metal layer, the second sub-common signal line is in the second metal layer, the first sub-common signal line is electrically connected with the second sub-common signal line through a second via structure which is in the insulation layer.

2. The touch control structure according to claim 1, wherein an orthographic projection of at least part of the second sub-common signal line on the base substrate is within an orthographic projection of the first sub-common signal line on the base substrate, and a first distance is between an edge of the at least part of the second sub-common signal line close to the first detection line and an edge of the first sub-common signal line close to the first detection line.

3. The touch control structure according to claim 2, wherein the first distance is greater than 0.8 µm and less than 1.6 µm.

4. The touch control structure according to claim 2, wherein
   the touch region is provided with a first touch electrode and a second touch electrode that are spaced apart from each other;
   a first touch electrode lead wire and a second touch electrode lead wire are arranged on a side of the common signal line close to the touch region, and the first touch electrode lead wire is electrically connected with the first touch electrode, and the second touch electrode lead wire is electrically connected with the second touch electrode;
   two adjacent first touch electrode lead wires in an extension direction of the first touch electrode lead wire are electrically connected through a first connection line, and two adjacent second touch electrode lead wires in an extension direction of the second touch electrode lead wire are electrically connected through a second connection line, one of the first connection line and the second connection line is only arranged in the first metal layer, and other one of the first connection line and the second connection line is only arranged in the second metal layer, and an orthographic projection of the first connection line on the base substrate at least partially overlaps with of an orthographic projection of the second connection line on the base substrate.

5. The touch control structure according to claim 4, wherein the first connection line is only arranged in the first metal layer, and the second connection line is only arranged in the second metal layer.

6. The touch control structure according to claim 5, wherein ends of the two adjacent first touch electrode lead wires close to each other are second ends, and each of the second ends comprises a first lead-out part and a second lead-out part which are sequentially stacked on the base substrate, and the first lead-out part and the second lead-out part are electrically connected through a third via structure which is arranged in the insulation layer, and the first lead-out part only comprises a part located in the first metal layer, the second lead-out part only comprises a part located in the second metal layer, and an orthographic projection of the second lead-out part on the base substrate is within an orthographic projection of the first lead-out part on the base substrate, and an area of the orthographic projection of the second lead-out part on the base substrate is smaller than that of the first lead-out part on the base substrate.

7. The touch control structure according to claim 6, wherein the extension direction of the first touch electrode lead wire is a first direction, and a direction perpendicular to the first direction is a second direction, in the second direction and on a first side of the first touch electrode lead wire in the second direction, a second distance is between the first lead-out part and the second lead-out part, and/or, in the second direction and on a second side of the first touch electrode lead wire in the second direction, a third distance is between the first lead-out part and the second lead-out part, and the first side and the second side are opposite to each other.

8. The touch control structure according to claim 7, wherein a value of the second distance ranges from 0.8 µm to 1.6 µm, and/or, a value of the third distance ranges from 0.8 µm to 1.6 µm.

9. The touch control structure according to claim 7, wherein in the first direction, a distance between two adjacent first touch electrode lead wires in the first direction is greater than a distance between two adjacent second touch electrode lead wires in the first direction.

10. The touch control structure according to claim 5, wherein on a plane parallel to the base substrate, planar shapes of the first connection line and the second connection line are both folded lines.

11. The touch control structure according to claim 4, wherein the extension direction of the first touch electrode lead wire and the extension direction of the second touch electrode lead wire are both parallel to an extension direction of the common signal line.

12. An electronic device, comprising the touch control structure according to claim 1.

13. A touch display panel, comprising:
a base substrate;
a display structure and a touch control structure that are sequentially stacked on the base substrate, wherein
the display structure comprises a planarization layer,
the touch control structure comprises a first metal layer, an insulation layer and a second metal layer that are sequentially stacked on the display structure,
on a plane parallel to a main surface of the base substrate, the touch control structure is divided into a touch region and a peripheral region surrounding the touch region, along a direction from the touch region to the peripheral region, the peripheral region comprises a first detection line and a second detection line that are sequentially arranged and spaced apart from each other, an orthographic projection of an edge of the planarization layer on the base substrate intersects with both an orthographic projection of the first detection line and an orthographic projection of the second detection line on the base substrate;
the first detection line is arranged in the second metal layer, and an overlapping part of the second detection line is arranged in the first metal layer, a first end of the second detection line comprises a first detection part arranged in the second metal layer and a second detection part arranged in the first metal layer, the first detection part is electrically connected with the second detection part through a first via structure penetrating through the insulation layer, and an orthographic projection of the overlapping part of the second detection line on the base substrate overlaps with an orthographic projection of the edge of the planarization layer on the base substrate;
the touch control structure further comprises a common signal line on a side of the first detection line close to the touch region, and the common signal line comprises a first sub-common signal line and a second sub-common signal line that are stacked, the first sub-common signal line is in the first metal layer, the second sub-common signal line is in the second metal layer, the first sub-common signal line is electrically connected with the second sub-common signal line through a second via structure which is in the insulation layer.

14. The touch display panel according to claim 13, wherein the orthographic projection of the edge of the planarization layer on the base substrate intersects with an orthographic projection of a part of the common signal line on the base substrate, and at least at a position where the common signal line overlaps with the edge of the planarization layer, an orthographic projection of the second sub-common signal line on the base substrate is within an orthographic projection of the first sub-common signal line on the base substrate, and a first distance is between an edge of at least part of the second sub-common signal line close to the first detection line and an edge of the first sub-common signal line close to the first detection line.

15. The touch display panel according to claim 14, wherein
the touch region is provided with a first touch electrode and a second touch electrode that are spaced apart from each other;
a first touch electrode lead wire and a second touch electrode lead wire are on a side of the common signal line close to the touch region, the first touch electrode lead wire is electrically connected with the first touch electrode, and the second touch electrode lead wire is electrically connected with the second touch electrode;
two adjacent first touch electrode lead wires in an extension direction of the first touch electrode lead wire are electrically connected through a first connection line, and two adjacent second touch electrode lead wires in an extension direction of the second touch electrode lead wire are electrically connected through a second connection line, one of the first connection line and the second connection line is only arranged in the first metal layer, and other one of the first connection line and the second connection line is only arranged in the second metal layer, and an orthographic projection of the first connection line on the base substrate at least partially overlaps with of an orthographic projection of the second connection line on the base substrate.

16. The touch display panel according to claim 15, wherein the first connection line is only arranged in the first metal layer, and the second connection line is only arranged in the second metal layer.

17. The touch display panel according to claim 16, wherein ends of the two adjacent first touch electrode lead wires close to each other are second ends, and each of the second ends comprises a first lead-out part and a second lead-out part which are sequentially stacked on the base substrate, and the first lead-out part and the second lead-out part are electrically connected through a third via structure which is arranged in the insulation layer, and the first lead-out part only comprises a part located in the first metal layer, the second lead-out part only comprises a part located in the second metal layer, and an orthographic projection of the second lead-out part on the base substrate is within an orthographic projection of the first lead-out part on the base substrate, and an area of the orthographic projection of the second lead-out part on the base substrate is smaller than that of the first lead-out part on the base substrate.

18. The touch display panel according to claim 17, wherein on a plane parallel to the base substrate, planar shapes of the first connection line and the second connection line are both folded.

19. The touch display panel according to claim 15, wherein the extension direction of the first touch electrode lead wire is a first direction, and a direction perpendicular to the first direction is a second direction, in the second direction and on a first side of the first touch electrode lead wire in the second direction, a second distance is between the first lead-out part and the second lead-out part, and/or, in the second direction and on a second side of the first touch electrode lead wire in the second direction, a third distance is between the first lead-out part and the second lead-out part, and the first side and the second side are opposite to each other.

20. The touch display panel according to claim 13, wherein
the display structure is an organic light-emitting display panel;
the organic light-emitting display panel comprises a pixel circuit layer, an organic light-emitting layer and an encapsulation layer that are sequentially arranged;
the touch control structure is on a side of the encapsulation layer away from the organic light-emitting layer.

* * * * *